United States Patent [19]

Swanson

[11] Patent Number: 5,140,917

[45] Date of Patent: Aug. 25, 1992

[54] METHOD AND APPARATUS FOR SEEDING AGRICULTURAL CROPS

[76] Inventor: Guy J. Swanson, S. 4305 University Rd., Spokane, Wash. 99206

[21] Appl. No.: 546,005

[22] Filed: Jun. 28, 1990

[51] Int. Cl.$^5$ .......................... A01C 21/00; A01C 7/06
[52] U.S. Cl. .................................. 111/187; 111/200; 111/73; 111/900
[58] Field of Search ................. 111/73, 118, 121, 125, 111/129, 120, 119, 139, 140, 141, 153, 164, 165, 167, 186, 187, 188, 200, 900, 923, 924

[56] References Cited

U.S. PATENT DOCUMENTS

| | | | |
|---|---|---|---|
| 1,857,749 | 5/1932 | White | 111/73 X |
| 2,001,003 | 5/1935 | Tuft | 111/73 X |
| 2,058,539 | 10/1936 | Welty et al. | 111/73 |
| 2,623,483 | 12/1952 | Stevenson | 111/73 X |
| 2,779,263 | 1/1957 | Franz et al. | 111/141 X |
| 2,920,587 | 1/1960 | Shriver | 111/187 |
| 3,362,361 | 1/1968 | Morrison, Jr. | 111/187 X |
| 3,512,489 | 5/1970 | Coldren et al. | 111/187 X |
| 4,044,697 | 8/1977 | Swanson | 111/66 |
| 4,333,534 | 6/1982 | Swanson et al. | 172/464 |
| 4,377,979 | 3/1983 | Peterson et al. | 111/52 |
| 4,422,392 | 12/1983 | Dreyer et al. | 111/52 |
| 4,452,315 | 6/1984 | Swanson | 172/29 |
| 4,520,742 | 6/1985 | Anderson | 111/86 |
| 4,565,141 | 1/1986 | Kopecky | 111/187 X |
| 4,624,196 | 11/1986 | Anderson | 111/52 |
| 4,781,129 | 11/1988 | Swanson et al. | 111/73 |
| 4,932,340 | 6/1990 | Benzel | 111/187 |

FOREIGN PATENT DOCUMENTS

| | | | |
|---|---|---|---|
| 525840 | 5/1955 | Italy . | |
| 521860 | 7/1976 | U.S.S.R. . | |
| 2060340 | 5/1981 | United Kingdom | 111/187 |

OTHER PUBLICATIONS

"Cereal Crops" Publication, by Warren Leonard et al., 1963, pp. 26–31, 150, 160–162 and 292.
WSU Field Days Jun. 26, 1979, p. 48 Hyde & Simpson.
WSU Field Days Jun. 25, 1981 p. 54 Hyde & Simpson.
ASAE Paper PNW81-305 No Till Drill Placement of Fertilizer in Small-Grain Production, Hyde & Simpson, Sep. 1981.
WSU Cooperative Extension Bulletin EM4547 Enble, Hacvorson, and Koehler.
Better Crops, Fall 1985, P.P.I., Dr. Paul Rasmussen, USDA, Pendleton Ore.
Farm Journal, Nov. 1983, "Feed The Wheat Starve The weeds" Glen Lorang.
No Till Farmer, Jan. 1986, "How 44 No Till Planters Measure Up", Frank Lessiter.
"Phosphorus Fertilizer Considerations for Maximum Yields in the Great Plains" Journal of Fertilizer Issues vol. 3, No. 3, Jul.–Sep. 1986.
Great Plains Soil Fertility Workshop, Mar. 1986, Nitrogen Interference with Puptake from Dual N-P Bands, J. T. Harapiak and N. A. Fiore.
Intensive Wheat Management, by Oplinger and Wersman Cooperative Extension, University of Wisconsin 1985.
Landowner, May 1989, "The Biggest Crop from Every Drop" Jerry Carlson editor.
Pacific Northwest No Till Guide, by G. J. Swanson, Jan. 1981.
Yielder Drilling Tech Letter 83-11, Paired Row Introduction by G. J. Swanson.

(List continued on next page.)

Primary Examiner—Dennis L. Taylor
Assistant Examiner—Jeffrey L. Thompson

[57] ABSTRACT

A method and apparatus for seeding agricultural crops in which seed is placed in residue-free rows that are closely aligned and associated with bands of deeply placed fertilizer whereby the plants from each seed row may access more than one deep band of fertilizer for the purpose of improving the utilization of fertilizer, improving plant growth and plant yield. The method is further enhanced by an apparatus that can seed, fertilize, and move residue by means of large deep-running blades in combination with a residue knife, a seed placement device, and a fertilizer placement device.

33 Claims, 13 Drawing Sheets

OTHER PUBLICATIONS

Bumper Times Inc., The Green Link, Level B, vol. 3, Dec. 10, 1988 by G. J. Swanson.
Farm Show, Jan. 1988, Double Seeding Stops Weeds Boost Yields.
Bumper Times Inc., Winter Wheat Production Standards, Level B, vol. 2, Oct. 10, 1988.
Agronomically Superior BIO Blade Opener, Dr. C. John Baker, Massey Univ. New Zealand.
Wheat Stand Establishment, by G. M. Paulsen KSU-8-5-110-B Department of Agronomy KSU.
Ortho Phosphate U.S. Poly Phosphate, Dr Roger Wilson T.V.A., Field Reprotive Pullman WASH Jan. 1987.
PHD Thesis Dr. Roger Wilson 1970 Montana State University Bozeman.
Better Crops, Fall 1985, PPI, Optimum Fertilizer Placement with Reduced Tillage Systems.
Hiniker 6150 Sweep Seeder Sales Brochure, Hiniker Co., Mankato Minn.
Plot Data, Crossrow Feeding, Lloyd Ranch Aug. 1990, Sep. 21, 1990 Letter University of DAMO.
Response to Three Hard Red Cultivars to Four Planting Arrangements Ketata Agronomy Journal, vol. 68 Mar.-Apr. 1976.
Relay Intercropping Soybeans into Winter Wheat and Spring Oats, Agronomy Journal Jan 1980, vol. 72.
Conservation Tillage for Wheat in the Great Plains USDA Extension Service Fenster, Owens, Follet.
WSU Field Days Jul. 10, 1980 Hyde & Simpson.
Bumper Times, Jun. 30, 1989, Level B vol. 6, Rotational Band Loading, G. J. Swanson.
Bumper Times, Oct./Nov. 1990, Level A & B New Product Announcement, by G. J. Swanson.
Bumper Times, Dec. 7, 1990, Level B, vol. 14 Rotational Band Loading Circa 1990, by G. J. Swanson.
Bumper Times, Jan./Feb. 1991 Level A & B vol. 16 Making Spring Wheat Compete, by G. J. Swanson.

FIG. 10
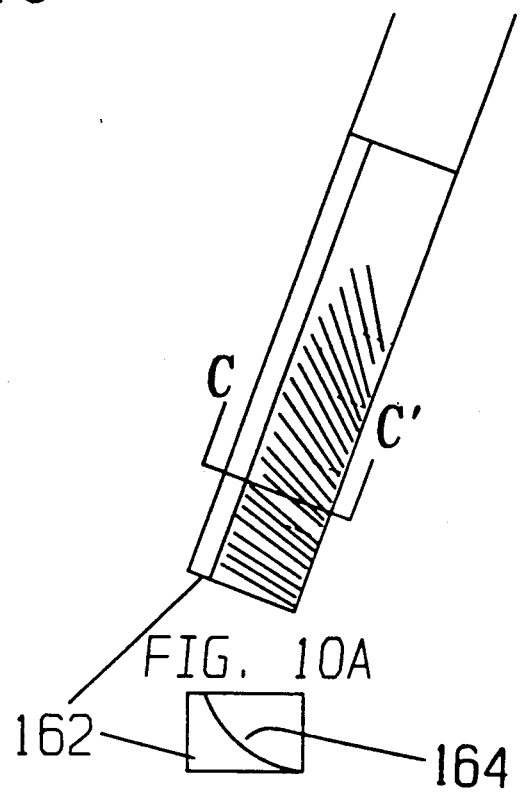
FIG. 10A
FIG. 10B
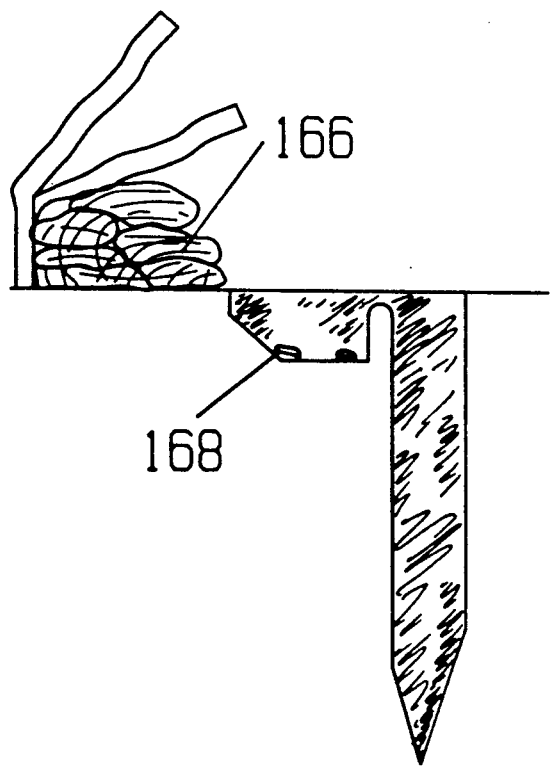

FIG. 11
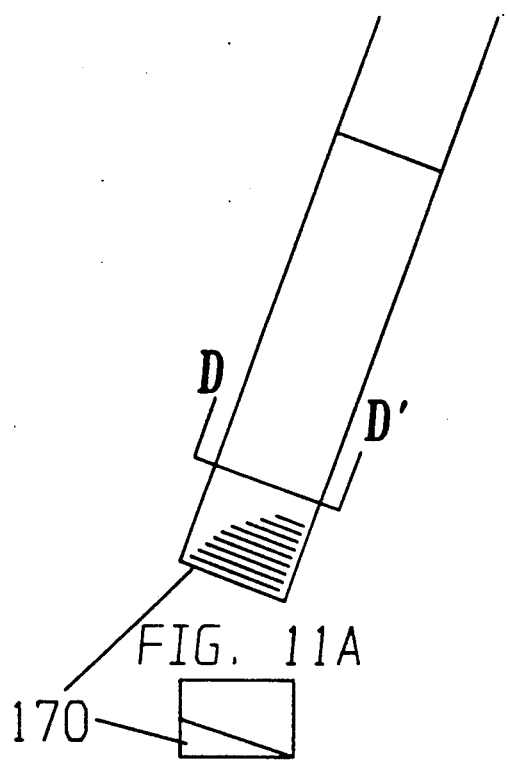
FIG. 11A
FIG. 11B
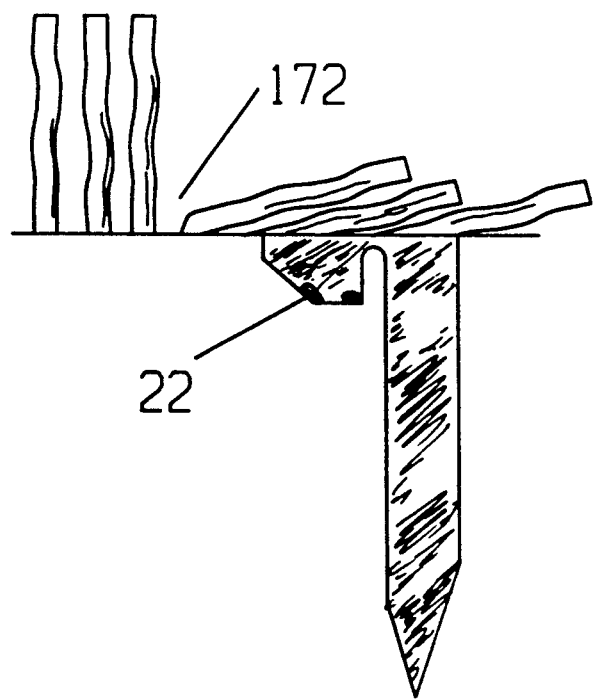

FIG. 12
FIG. 12A
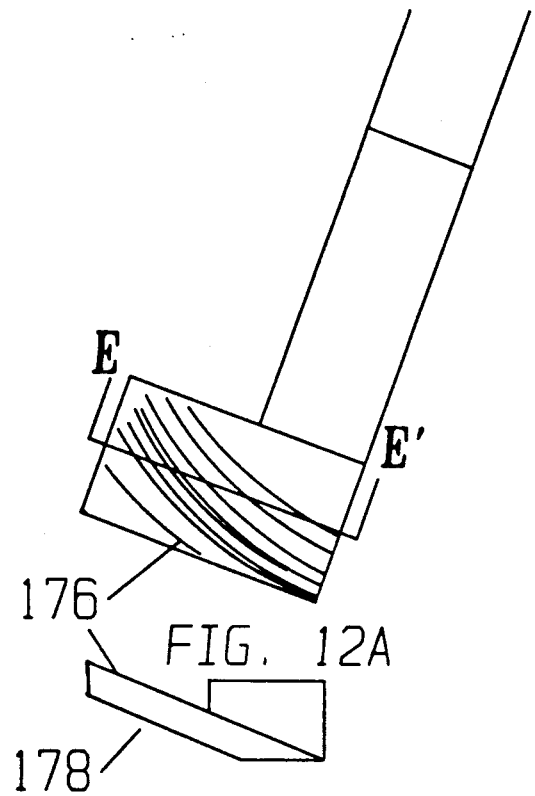
FIG. 12B
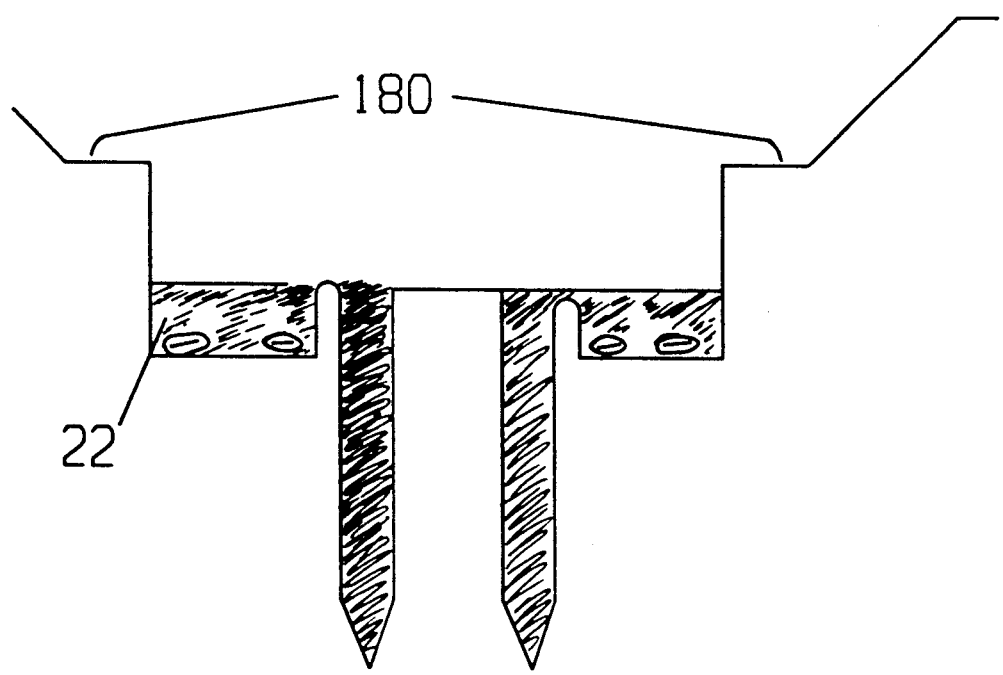

METHOD AND APPARATUS FOR SEEDING AGRICULTURAL CROPS

FIELD OF THE INVENTION

Summary of the Invention

The present invention relates to a method and apparatus for placement of fertilizer and seed while planting an agricultural crop. Fertilizer is positioned in subsurface bands below seed rows in such a manner that seminal (initial) roots can access more than one band of fertilizer. The close parallel alignment of the seed rows with their primary bands of fertilizer plus the adjoining seed rows' primary bands of fertilizer provides access for each seed row to the fertilizer band of the adjacent row. This feature, called cross row feeding, improves the uptake of nutrients by the growing plant, and allows certain bands to be highly concentrated with nitrogen fertilizer and less concentrated with phosphate and potash fertilizer. Seminal roots of seeding plants are thus able to access fertilizer at more than one site below the seed.

The present invention consists of a method of placing seeds and fertilizer for the purpose of enabling cross row feeding together with an apparatus for the purpose of carrying out the method. The apparatus removes residue from the seed row, places seed and deep bands of fertilizer on very narrow row spacing, allowing each seed row to access more than one deep band of fertilizer.

Terms

To assist in understanding of this invention, the following terms have been defined:

Broadcast—This term refers to a surface application of fertilizer, i.e., fertilizer that is applied on a broadacre basis without soil incorporation or banding.

Calcareous Soils—Soils with a ph above 7 which are high in calcium. Normally found in lower rainfalls of the Great Plains. The calcium carbonate in the soil reacts with applied phosphate to form calcium phosphate which decreases the efficiency and the availability of $P_2O_5$ Phosphate.

Calcium Carbonate—Lime, or calcium carbonate is used to neutralize or sweeten acidic soils. A ph of 6.5 to 6.8 is ideal for most agricultural crops. Soils with a high lime content 7.5 to 8 ph will lower chemical availability of phosphate.

Cephlasporium Fungus Stripe—A disease of winter wheat related to previous winter wheat crop residue incorporated into the soil which said residue provides a medium for transfer of the disease to the next crop.

Cercosporella Foot Rot—A disease of winter wheat which is not found in no till fields due to the lack of tillage and the excellent soil condition providing good drainage with no soil splashing under rainfall Cross Row Feeding—One seed row with access to more than one deep band of placed fertilizer. The adjoining seed row shares its deep band of fertilizer with at least one or more seed rows.

Deep Running Blade—A blade that is forced to rotate as the machine frame moves forward. It normally runs at a depth of 3" to 7" in the soil The weight of the machine is applied to the blade.

Deep Furrow—It is used in the propagation of primarily winter wheat in the Pacific Northwest and Colorado using openers and packers that produce rigid soil corrugation across a field whereby the winter wheat seedling is protected in the valley of the corrugation. This allows snow trapping and protection from winter winds.

Direct Injection—A nozzle located directly behind the deep running blade and centered directly over the slot created by the blade which applies liquid fertilizer under a pressurized stream into the deep slot.

Fargo—A soil active herbicide applied close to the soil surface and incorporated into the soil to control weeds such as wild oats. The material is manufactured by Monsanto.

Furrowing Knife—A narrow angle tool with an extension that can be lowered into the soil causing a high degree of soil and debris flow. Furrowing knives allow seed to be placed on a soil shelf in close proximity to sufficient soil moisture. Furrowing knives in combination with packer wheels provide snow trap and winter protection by forming deep corrugations in the soil.

Glean—A non volatile surface applied herbicide used to control weeds that germinate in the top 2 surface inches. The herbicide has been effective for up to four years after application in controlling weeds. The long term residual effect can be non beneficial to certain no till crops. Some tillage may be required to dilute the material. The material is the exclusive product of DuPont.

Immobile Fertilizer—Phosphate and Potash are considered stationary or quiescent in the soil. Residual Phosphate will move about $\frac{1}{4}$" per year if the soil is not disturbed or tilled. P and K do not follow the wetting front of soil moisture.

K—Potash, Potassium chloride, KCl, or Potassium Sulphate $KSO_4$.

S—Sulphur or Sulphate ($SO_4$) fertilizer

Low Disturbance Knife—The low disturbance knife is designed to cause soil and organic matter to flow around the seed placement device. Very little soil is disturbed with this narrow tool. Also referred to as a soil shaving knife or a residue knife.

Mobile Fertilizer—Nitrate nitrogen and sulphate sulphur are mobile in the soil and follow the wetting front. Ammonic nitrogen as $NH_4$ is considered to be stable until soil bacteria called nitrate bacteria convert the chemical makeup to $NO_3$ which is mobile. Mobile fertilizer is highly desirable when properly managed.

N—Nitrogen fertilizer: $NO_3$ Nitrate nitrogen is plant-available and mobile in the soil. Anhydrous ammonia, $NH_3$ is a low-cost Nitrogen fertilizer.

$NH_3$—Anhydrous ammonia. Manufactured from atmospheric nitrogen and natural gas, the product is delivered as anhydrous liquid under pressure. As soon as $NH_3$ contacts soil moisture it is converted to $NH_4$.

$NH_4$—Ammonic nitrogen attached to moisture in soil particles. Stable in the soil.

NPKS—A common term for an adjunctive blend of plant food used to produce agriculture crops. Other secondary and micronutrients may also be present.

Osmotic movement—Soil moisture moves in the soil by capillary action from an area of higher concentration to an area of lower concentrations. The movement is similar to a paper towel lowered into the water. The water will move upward on the towel until the towel is completely saturated. A tear in the towel will result in non movement of moisture across the non consistent air barrier. Soil fractures which result from tillage operations prevent osmotic movement of moisture in the soil.

P—Phosphate fertilizer or $P_2O_5$

Paired Squared—A seeding method where two seed rows work together to allow double root access to their primary deep bands. Each row accesses its own deep band and the deep band of the adjacent row.

Paired Row—Two seed rows are arranged so the roots may access one deep band of fertilizer placed between the rows. A common practice in the western United States, Canada, and Spain for production of agricultural crops. A common arrangement of row spacing is 5/15 referring to the number of inches between the paired rows (5) with the single fertilizer deep band centered between the paired rows, and with a 15 inch dead-band between the row pair groups.

Primary Band—A primary band of fertilizer is found below the seed row and or slightly to the side of the seed row depending on the apparatus. One seed row having one primary deep band.

Radius Fertilizer Shank—A fertilizer placement tool which directly follows the deep running blade and places a charge of $NH_3$ and/or dry NPK fertilizer. The shank is curved to match the radius of the deep running blade.

Raised Soil Berm—A barrier of soil, formed between the soil shelf and the deep fertilizer slot. The raised berm prevents seed from falling into the deep slot formed by the deep running blade, particularly important and effective for hillside applications.

Rhizoctonia Root Rot—A disease of wheat and barley that requires carefully management under no tillage. Rhizoctonia can be avoided by using some surface tillage in the seed zone. Soil active chemicals can damage the crop root system and predispose the plant to Rhizoctonia. Prudent no till farmers can avoid the disease by killing all vegetative growth and waiting 28 days before seeding. Standard disturbance knives and furrowing knives provide for some tillage which breaks the disease cycle and allows seeding to occur directly after herbicide spraying.

Rooting Cone—A boundary found directly under the seed which proceeds on 45 degree cone shape for a vertical distance of 4" below the seed. The rooting cone area is considered the ideal site for placement of immobile plant food. The base of the rooting cone is normally 8" in diameter and 4" below the seed.

Secondary Band—A band of fertilizer that is placed adjacent to one seed row in alignment with the seed row but due to its spacing in relation to other seed rows allows access of plant food from the adjacent seed rows. One seed row accessing two or more bands of which one is a primary band and the other band is a secondary band (the primary band of another row). Secondary bands are arranged at the base and the outer edge of the rooting cone in the practice of this invention.

Soil Shelf—An unfractured subsurface soil layer created by a residue knife in combination with a seed placement device which allows soil moisture to move via osmotic pressure into the germ of the seed. The soil shelf does not have surface organic residue present due to the operation of a residue knife closely followed by the seed placement device.

Standard Disturbance Knife—Operates as soil and straw removal knife tool. The knife directs surface debris and soil to the side of seed row creating a surface tillage strip. Soil-active chemicals are diluted with soil movement and volatile herbicides are incorporated into the soil surface away from the seed row. The cutting edge is parabolic. Also referred to as a soil shaving knife or a residue knife.

Swept Back Fertilizer Shank—Directly follows the deep running blade and places a toxic charge of $NH_3$ and dry NPK. The shank is curved away from the deep running blade on a radius. The shank is swept backwards so residue will not collect at the shank.

Swept Back Slipperfoot Shank—A device for opening the soil and placing seed or fertilizer which is located alongside the deep running blade and behind the leading, cutting edge of the blade. Surface residue is cut by the deep running blade which causes the residue to flow to the side. The slipperfoot is swept back requiring more downward pressure to be applied to the opener. Very little soil movement or soil fracturing occurs with the slipperfoot.

Treflan—An immobile soil active herbicide applied in the top 2 surface inches of the soil to control germinating weeds. The material volatilizes into the atmosphere if surface applied and not incorporated into the soil. The material is manufactured by Eli Lilly.

Tri Squared—Three associated seed rows each having a deep band of fertilizer. The center seed row access three deep bands of fertilizer. The outside seed rows access two bands of fertilizer.

Unfractured Soil—Unfractured, consistent, firm soil. Tillage produces fractured soil or soil filled with air pockets which does not allow consistent movement of soil moisture. The method of this invention results in seed being placed on unfractured soil to take advantage of the beneficial effects of osmotic moisture movement to the seed.

BACKGROUND OF THE INVENTION

Discussion of Prior Art

Due to increasing concern with respect to loss of topsoil caused by erosion, conservationists and farmers alike have searched for new ways of farming which will reduce the amount of soil loss. From this concern arose the concept of "no till" farming. The farmer eliminates the step of tilling the stubble left from a harvested crop prior to the planting of a new crop. The new crop is planted directly into the standing stubble. The stubble is effective in holding moisture in the soil regardless of the condition of the terrain. Because of its water retention capabilities, the stubble greatly reduces the amount of surface water runoff from a field area. In addition, the stubble also greatly reduces the loss of topsoil through the eroding action of wind and water runoff. It also reduces the amount of herbicide and fertilizer losses which are normally caused by wind and water runoff from a field area.

Because of the important concepts surrounding the use of "no till" method of farming is the minimization of soil disturbance, there has been a great deal of research and effort directed toward developing apparatus and methods for simultaneously planting and fertilizing a crop in a single pass across a field area. In addition to minimizing the amount of soil disruption, the ability to fertilize and seed a crop in one pass across the field area also can cut in half the time it takes to seed and fertilize crop. Thus, the same amount of machinery can seed and fertilize a much larger area than if two separate passes were necessary. This also greatly reduces the amount of fuel and labor required to run the farm machinery for the planting operation.

There has been a considerable amount of research and experimentation directed toward finding the optimum use of fertilizer and relating to its placement with respect to the rows of seed which have been planted. Research has shown that the fertilizer should be placed in subsurface or "deep" bands at a depth below the depth of the seed in the seed rows. This fertilizer placement provides the most efficient access to the fertilizer by the crop and minimizes competition from surrounding weed roots.

Hyde and Simpson at Washington State University carried out extensive research from 1977 through 1982 regarding fertilizer placement directly below the seed and also to the side of the seed. *WSU Field Days* Jun. 26, 1979, Page 48; *WSU Field Days* Jun. 25, 1981, page 54; *WSU Field Days* Jul. 10, 1980, Page 47; ASAE Paper PNW 81-305, "No Till Drill Placement of Fertilizer in Small Grain Production", Hyde and Simpson report experimenting with banded fertilizer below the seed, beside the seed, in the seed row and broadcast and at no time considered or proposed a cross row feeding system. Machinery used in testing placed fertilizer and seed on 16 inch centers, 8 in centers or with 9 inch seed centers and broadcast fertilizer.

Cooperative Extension at Washington State University filed an extensive report on fertilizer placement in 1980. Dr. Carl Engle, Dr. Al Halvorson, and Dr. Fred Koehler reported the advantages and disadvantages of fertilizer placement in bulletin No. EM 4547. Neither the method nor the apparatus of this invention is discussed in whole or in part in this publication.

USDA Scientist Dr. Paul Rasmussen reported his finding from the Pendleton Research Station in *Better Crops*, fall of 1985. He talks about the five ways to fertilize a no till crop. At no time does this report consider or discuss the possibility of narrow rows accessing non-dedicated deep bands of fertilizer with, or in addition to primary deep fertilizer bands.

In November 1983 the *Farm Journal* reporter Glen Lorang reported a new seeding concept called paired row as well as the machinery available to place fertilizer directly below the seed. The article illustrates a system designed by the inventor Guy Swanson at Yielder Pioneer. The present invention is not included in this report, nor would the apparatus function under the method of this invention because of the impossibility of adjusting the described equipment to the configuration necessary to carry out the method of this invention.

The *No Till Farmer* in January of 1986 did a complete report on the various no till planters and no till drills. The various types of fertilizer placement tools and techniques are listed in the publication included. This compendium makes no comment regarding cross row feeding, nor is there included any speculation about the concept.

In September 1986, John Harapiak and Jim Beaton published a review of phosphorus fertilizer considerations for the Great Plains. The author discusses dual N-P banding, new planting technique, residual fertilizer and how it affects new crop production, band distance from the seed row, enhanced phosphate efficiency, nitrogen interference with phosphate (P) uptake from dual N-P bands and influence of nitrogen source on potential for N interference. There is no discussion speculation about the present invention in this publication.

J. T. Harapiak and N. A. Flore presented a paper at the Great Plains Soil Fertility Workshop, March 1986. The paper, entitled "Nitrogen Interference with P Uptake from Dual N-P Bands", discusses the importance of nitrogen concentration in a fertilizer band of Nitrogen and Phosphate. No system is proposed or discussed regarding the present invention.

*Intensive Wheat Management*, by Edward S. Oplinger and Daniel Wersman, Cooperative Extension, University of Wisconsin, 1985 discusses techniques for maximizing wheat yields. Cross row feeding at any row spacing or any seed rate is not proposed or discussed.

*Landowners Magazine* in May of 1989 discusses a new seed opener, the New Zealand Cross Slot. This new seed opener places a fertilizer charge to the side of the seed row. The equipment described in this article is incapable of carrying out the method of the present invention and is not designed to move residue or create a soil tillage strip.

"The Pacific Northwest No Till Guide", by Guy Swanson, 1981, Pioneer Drill Inc., explains many of the new fertilizer methods of no till farming. Guy Swanson adopted paired row to Pioneer and Yielder no-till drills. The article discussed paired row and equilateral row space. No reference to cross row feeding is made. In the "paired row" concept, a single fertilizer band is placed between two seed rows. While effective, this concept is wholly different from the present invention.

G. J. Swanson, December 1988, "The Green Link", *Bumper Times*, discusses the findings of Dr. Albert Roveria of Australia whereby the disease Rhizoctonia can be controlled by means of an 8 inch wide tillage strip in the no till seedings. The article does not discuss a residue removal knife operating with a deep running blade to clear a path 8 inches wide for improved stand establishment as the present invention does.

An article from *Farm Show*, January 1988 "Double Seeding Stops Weeds, Boosts Yields" discusses why narrow rows (3½") actually eliminates or reduces the need for herbicides. No consideration is given for fertilizer band placement in relation to seed rows and the narrow spacing is for tillage systems only. In the system described, fertilizer is placed in a separate operation and fertilizer bands are not aligned with seed rows.

On Oct. 10, 1988, Guy Swanson, the publisher of *Bumper Times* released an article discussing the most advanced standards for producing winter wheat in a paper titled "Winter Wheat Production Standards." The article discusses band concentration, band spacing and seed row spacing. Several supporting articles are noted. Neither the main article nor the supporting articles discuss a method or apparatus for cross row feeding.

New Zealand scientist Dr. C. John Baker of Massey University discusses his invention in a brochure entitled "The Bio-Blade Opener". Dr. Baker discusses such factors as minimum surface disturbance and a mulch cover over the seed. A scalloped disc is used to fracture soil with most disturbance below the surface in the seed zone. The opener is designed as a no tillage opener. Dr. Baker points out: "No other opener separates seed and fertilizer into two distinct *horizontal* bands which enhances fertilizer utilization and avoids fertilizer seed burn." Dr. Baker's New Zealand opener has evolved based on a need which is not evident in North America. This opener will not move and stack residue to the side of the seed row. It will not place $NH_3$ deep in the soil away from the seed. The opener as advertised places a toxic fertilizer charge to the side of the seed thus placing fertilizer outside the rooting cone and not providing an initial seminal root access. This opener does not place fertilizer sufficiently deep to provide plant seminal root access to more than one band of NPKS. The placement of seed and fertilizer at the same elevation in the soil is contrary to the teachings of this patent. Dr. Baker reports ". . . this outwardly tapering shatter zone encourages root growth." This is most contrary to the teachings of this invention in which seed is placed on firm, unshattered, moisture laden soil to promote osmotic moisture flow. Dr. Baker also states that ". . . Organic mulches are well recognized as moisture traps for seed beds; the New Zealand Bio-Blade opener simply insures that the organic residue remains in the most important place of all—directly above the seed zone." The teachings of the present invention indicate that when surface organic matter, soil active chemicals, and dry soil are removed from the area directly above the seed, yields are enhanced substantially and the cropping systems are more consistent, persistent and productive.

G. M. Paulson, 1985, "Wheat Stand Establishment", KSU 85-110-B Department of Agronomy, Kansas State University, reports that two opposite trends in row spacing are evident: Narrow rows for intensive management and wide rows for conservation tillage and intercropping systems. [re: Chan, 1980, "Relay Intercropping Soybeans Into Winter Wheat and Spring Oats", Agronomy Jouranl 72:35-39, and Fenster, 1977, "Conservation Tillage for Wheat in the Great Plains", USDA Ext. Ser. PA-1190, 32 pgs.]

Another reference which gives information contrary to the findings of this inventor is exemplified by the statements: "Cross drilling, however, gives the same grain yields as unidirectional drilling.", and "Under low soil moisture, substantial differences in row spacing may not affect grain yield." re: Ketata, 1976, "Response of Three Hard Red Winter Wheat Cultivars to Four Planting Arrangements", Agronomy Journal, 68:428-429. The responses to multiple closely-spaced fertilizer rows by wheat in a single row was discovered by this inventor in an accidental cross drilling. The above "facts" have been found to be untrue doctrines in view of the new serendipitous discovery of cross row feeding. The new seeding apparatus of this invention further enhances the method. Previous teachings regarding row spacing, band spacings and residue manipulation are nullified by this invention.

Dr. Roger Wilson of the Tennessee Valley Authority discusses phosphate efficiency in a January 87 paper "Ortho Phosphate v.s. Poly Phosphate". Dr. Wilson does not suggest or propose a cross row feeding system to improve immobile P efficiency.

Research and testing indicate fertilizer placement can be either in a band directly beneath the seeds or in bands below and to the side of the seed row. However, research has indicated that there is a potential problem in placing fertilizer in a band directly beneath the seeds since it risks accidental damage to the seeds by physical contact with the active fertilizer elements. This problem is pointed out in an article entitled "Fertilizer Management And Conservation Tillage of Pacific Northwest Cereals" published in Better Crops in the fall of 1985 by Paul E. Rasmussen, PhD, which indicated that anhydrous ammonia injected directly below the seed is not recommended because of possible migration into the seed zone without proper closure of soil behind the shank.

One problem with deep side banding of fertilizer associated with a single row of seed is that for each row of seed, a deep band of fertilizer is required. In addition, any weeds which are on the opposite side of the deep banded fertilizer from the seed row have the same access to the fertilizer as do the desired crop plants.

It has been determined through tests that a better system of utilizing subsurface banding of fertilizer is to place the subsurface band of fertilizer below and between two parallel seed rows. This has two advantages over single side banding. First, only one band of fertilizer is necessary to fertilize two seed rows. Secondly, with a row of seeds on each side of the banded fertilizer, each row has equal access to the fertilizer which reduces access to the fertilizer by weeds. This method of planting seed crops is shown in Italian Patent No. 525,840 to Panichi, granted May 11, 1955, published in August of 1957. The Panichi patent discloses apparatus for planting two parallel rows of seeds and depositing fertilizer beneath the ground between the rows of seeds. The Panichi patent also recognizes the problem of seed damage when the fertilizer was placed directly with the seeds.

OBJECTS AND ADVANTAGES OF THE INVENTION

A continuing object in no till farming, as in other methods of farming, is to increase the yield from a given field area while minimizing the increase in costs associated with that increased yield. There are several factors which relate to the yield from a given field area and which must be considered in any method of farming.

The first of these factors is planting the optimum number of seeds per unit of field area. A number of considerations which affect the optimum number were discussed in an article entitled "Stand Establishment" which appeared in the Wheat Grower in July of 1985. In that article it was stated that a rough rule of thumb for winter wheat seeding rates in intensive management farming is that there should be ten viable seeds per square yard for each inch of annual precipitation, up to about forty inches.

A second factor which affects the yield is the amount of fertilizer used and its placement. As stated above, the ideal placement makes fertilizer accessible to the maximum number of crop plants while minimizing its accessibility to weeds. The type of fertilizer is very important in determining its optimal placement.

A third factor which affects yield is the effectiveness of the desired crop in being able to choke out weed growth with a minimal amount of herbicide being used. This ability is dependent upon the crop getting an early, strong growth start, i.e., a head-start on the weeds. It is also dependent upon the crop row spacing across the field.

A fourth factor that affects yield is the concentration of fertilizer chemicals in the fertilizer bands. Dilute bands of fertilizer are better for spring crops. Concentrated bands of anhydrous ammonia are better for fall crops.

A fifth factor that affects yield is the actual genetic design of the root system. Roots of certain agricultural crops such as wheat grow in "rooting cones". In these crops, three to six seminal roots proceed radially outward and downward at an angle of thirty to forty-five degrees from the vertical direction, spreading radially until they reach a radius of about four inches, after which the growth is approximately downward, vertically. If phosphate fertilizer is properly located at more than one location within this rooting cone, fertilizer use is more efficient, more soil moisture is harvested because of the more extensive root system, and the result is a higher yield. Multiple site access and greater assimilation of NPKS results in converting more soil moisture into crop yield.

Another major object of this invention is to place the toxic fertilizer closer to the seed while isolating the seed from the toxic effects of the fertilizer and yet allow tap rooted crops to access the single closely aligned primary band of fertilizer for maximum plant food efficiency.

Another object of this invention was to provide a new opener design to implement a method of seeding whereby the seed rows were very close allowing multiple site access of fertilizer and yet able to pass through significant amounts of residue that would cause a normal machine to plug up.

An important factor, especially in "no till" farming operations, is that all operations must be done with minimal disruption to the soil surface of the field area, and should be done in a single pass across the field area. The instant invention arose from the requirements for increasing yield from "no till" farming operations while minimizing the cost increases associated with the increased yield. An important advantage is that solid, liquid, or gaseous fertilizer could be used with the same farming method. This makes available all options in the choice of fertilizer chemical makeup and form.

Another advantage of this new method of seeding crops is that it requires minimal alterations to existing equipment.

Another advantage of this method of seeding and fertilizing is that it reduces the mobility of nitrogen in fall plantings by producing a more concentrated band of nitrogen for fall crops and yet the same method allows for bands to be diluted for spring crops, thus providing higher efficiency in the utilization of NPKS.

Another advantage of this method of seeding and fertilizing is that bands are placed at a level, or elevation in the soil profile, where no deep band disturbance will occur with a minimum tillage operation. Thus, the old bands with residual NPKS not utilized by the first crop remain in a concentrated and available form for maximum chemical and positional availability for future crops.

The Discovery of Cross-Row Feeding

The discovery of cross row feeding occurred in a field seeding whereby the field was seeded twice within a few short hours. A Yielder paired row 5/15 drill, manufactured by the former Yielder Drill Inc., previously Pioneer Drill Inc., of Spokane Washington, had been set up to seed winter wheat. The drill operator who is also the inventor had installed the incorrect sprockets in the drive train which caused the drill to meter seed and fertilizer at half rates. Upon seeding 20 acres he discovered the mistake and went back over the acreage seeding and fertilizing at half rates a second time. The balance of the field was seeded and fertilized one time at full rates. Two observations were made over the following 10 month period. Wherever a lap occurred or the deep bands and seed rows became very close in alignment due to the double seeding and fertilizing, a unique phenomenon occurred. The growing crop became bigger and greener as the drill began to skew towards the first seeding bands and seed rows. At harvest time there was an overall yield increase on the portion of the field that had been double seeded by mistake. The yield increase was estimated by the combine operator at 15 to 20 percent. The inventor having closely observed the entire field throughout the growing season and knowing that each treatment had received equal overall rates began to wonder if the wheat roots were accessing more than one fertilizer band. Furthermore the inventor began to study how a machine could be modified to put down twice as many seed rows and deep bands, and in a configuration that would take advantage of the accidental discovery.

The next step was a planter box greenhouse study carried out by the inventor, of closely aligned seed rows with deep bands aligned with the rows allowing access of the plant root system of more than one band of fertilizer. What the inventor discovered in the planter box after washing the roots back was a highly concentrated colony of roots located where the fertilizer had been placed. Further inspection revealed that the seed rows were sending out roots to adjoining bands and finding those adjoining bands even though other rows were accessing the same band of fertilizer. This discovery led to another finding that had occurred in the field. Paired row 5/15 spacing yielded better than equilateral 10 inch row space seeding in spring crop. See Farm Journal article of November 1983, "Feed the Wheat Starve the Weeds". The 10" rows were not accessing the center deep band 5" to the side of the seed row. However, when the drill seeded on paired row 8/12 the drill produced consistent good yields in spring and fall crops. The inventor concluded after carrying out a field wide observation that seed rows 8" apart could still access one deep band between the rows if the fertilizer bands were in the ground to a depth of 5" to 6".

With these discoveries in mind the inventor concluded that he would need to develop a new opener that would deep band fertilizer with each row, be closely aligned and function in heavy residue. This new opener would need to move residue, seed and deep band simultaneously on very narrow row spacing to achieve cross row feeding. The inventor talked with several researchers at the UDSA and Washington State University to determine if they had tried deep banding and seeding on 4" row spacing. The researchers reported that conservation tillage drills must have residue clearance and there should be no need to seed on row spacings of less than 8". The researchers also stated that in the interest of machine efficiency of design and maintenance it would not be necessary to deep band on less than 15" centers.

Never forgetting the mistake of the previously double seeded field, the inventor felt that there would be even greater yield potential if an opener could be developed that could handle residue and produce a new method of seeding which would allow each seed row's root system to feed on multiple bands of fertilizer.

On Jun. 30, 1989, the inventor and publisher of *Bumper Times* published an article proposing a new commercial fertilizing and seeding method never before used in agricultural crop production. The inventor termed the system "Paired Squared" and "Tri Squared", referring to the configuration of seed and fertilizer placement which allow multiple fertilizer band access for each seed row, the subject of this invention.

Having continuously observed no till drills in the field since 1974 and having made several machine changes to accomplish specific yield goals, the inventor felt that a new opener could be developed and mounted on the floating tool bar as described in U.S. Pat. No. 4,333,534.

The inventor reviewed all the problems that are faced in a no-till farming system. One very major goal had to be kept in mind with regard to the seed opener: To place seed on a firm and unshattered seed bed which allows osmotic movement of moisture to the seed and that the seed must rest in the soil with little or no surface organic matter present in the immediate vicinity of the seed, and that toxic products found in the first surface inch of soil must be removed or diluted so that all seed would germinate simultaneously in a moist soil environment and emerge through one to one and a half inches of covering soil.

Many of these problems were solved in two previous patents issued to the present inventor, Guy Swanson and Morton Swanson. The Composter described in U.S. Pat. No. 4,781,129, and the Straw Straightener described in U.S. Pat. No. 4,452,315 discuss a multiplicity of problems associated with the movement of residue away from the seed row.

The inventor had previously developed a tool referred to as a Straw Straightener. The Straw Straightener was designed to make straw flow around a double disc seed opener to prevent tucking of straw into the seed row. The Straw Straightener was not developed to move soil since no tillage was most desirable at the time of its development. If the Straw Straightener was lowered significantly deep ($\frac{1}{2}$") into the soil, the seed opener would stop rotating and the drill would plug, thus the straw straightener was limited to a non-tillage firm soil situation with no soil movement. As it became more important to move soil active chemicals, surface residue and dry soil, the Composter tool described in U.S. Pat. No. 4,781,129 was developed. Composters limited seeding speed to 5 MPH and created corrugations across the field which eventually produced harmonic vibrations on the harvest machinery. The deep furrow effect provided a snow trapping effect for winter hardiness of winter wheat. The composter design greatly complicated the machine design and resulted in considerable additional machine weight.

The inventor discovered that a new opener could be developed that had a deep running disc which was forced to rotate as the machine moved forward. The weight of the machine could be applied to the disc forcing it to turn. Furthermore the inventor discovered that a sharp angled knife running alongside the deep running vertical disc could cause soil and surface debris to be cut by the blade initially and the adjoining soil shaving knife would create a natural soil and debris flow around the knife which would allow a seed furrowing device located directly behind the knife to place seed in clean unshattered soil, laden with moisture, and ideal for germination of placed seed. Furthermore it became apparent to the inventor that the same deep running blade would create a slot in the soil in which fertilizer could be placed. The inventor further discovered that fertilizer could be placed in a deep slot very close to the seed row, without damaging the seed using such tools as radius shanks, swept back shanks, direct injection tools, and/or a swept back slipperfoot shank running alongside the deep running disc blade and yet on the opposite side of the disc blade from the seed placement device. The swept back slipperfoot created the least amount of soil disturbance and provided excellent seed placement.

Another unplanned discovery of this new seeding, soil shaving and fertilizing opener was that the existing seeding drills could be modified with the new opener. Installation of the new opener on existing machines reduced the weight of the machine by some 10,000 pounds and made the machine simpler.

The opener provided additional new yield enhancing features such as cross row feeding, more seed rows and residue removal.

The discovery of this new opener allows for a new commercial seeding drill that costs half as much and makes the machine design practical for a wider seeding apparatus that can also seed at higher speeds. Wider machines can seed more acres per day resulting in less machine investment per farm. Higher yield potential and more persistent and consistent production using this new opener technology will result in significant commercial interest.

The inventor discovered after several years of development that three types of angled knives could be used to generate various degrees of soil movement which resulted in significant control over the size of the furrow and the degree of soil movement.

No till drills were initially developed to provide placement of seed and seed row fertilizer in heavy residue, untilled soils. The second generation of machines was designed to band volatile nitrogen and immobile phosphate deep in the soil below the seed or below and to the side of the seed row.

Practical use of the no till system has reverted to a third generation, single pass system using some degree of surface tillage to combat diseases such as Rhizoctonia root rot. Some surface tillage in a narrow seed row area also improves soil warming in spring. Furthermore a soil strip free of organic residue improves seeding stand and crop establishment. Furthermore certain volatile chemicals such as Fargo and Treflan can be incorporated into the first surface inch if the drill produces some tillage effect. Furthermore, it has been determined that a carryover of certain soil active chemicals such as Glean can predispose the crop to root diseases. Dilution of the carryover chemical in the seed row area improves the probability of an excellent stand.

On the other hand, too much tillage would create an ideal environment for Cercosporella foot rot and Cephlasporium fungus stripe. Too much tillage also creates channels for erosion, therefore it has been determined that a narrow soil tillage strip in the seed row area should be disturbed but yet allow seed to be placed on a firm soil shelf for moisture movement to the seed. This is accomplished with a standard disturbance knife.

Certain soil types in the western United States are very dry at the normal seeding depth ($1\frac{1}{4}$") at seeding time. Consistent germination moisture may be found at the 4" to 5" level. A tool such as a furrowing knife can be used to move dry soil ($2\frac{1}{2}$") and place seed at the 4" level with only $1\frac{1}{4}$" of loose soil covering the seed. The furrowing knife creates considerable tillage and of course a rough corrugated field effect that provides a snow trap and winter protection from cold dehydrating winter winds that can easily kill unprotected succulent winter wheat plants.

A low disturbance knife has been developed to provide virtually no soil disturbance with no organic residue in the seed row. Certain crops prefer no soil movement and narrow seed rows. This improves biological competition with weeds and limits the use of selective herbicides.

Seeding speeds also require knives of various degrees of soil movement. High speeds may require low angle nonparabolic knives.

Over the last decade several serendipitous discoveries have been made with regard to the design of no till machinery. The design of the present opener comes from a series of observations made in North America. It is understood that no one knife is ideal and all openers require at least three knife types to be commercially successful. Many new knife configurations are anticipated, all of which must function with a deep running blade and a seed placement device.

Commercial Significance of this Invention

Over the years farmers have struggled with rising costs, increased regulation, and environmental concerns regarding the runoff of surface water carrying with it mud and fertilizers which pollute the streams. The loss of soil and nutrients is not only detrimental to the profitable operation of the farm, but also carries with it a huge environmental cost. One stream in the pacific northwest is reported to carry some two hundred times the EPA allowable content of phosphates. The source of these pollutants is the small grain farming operations in the area. Previous no-till farming systems utilized top-dressed, or broadcast fertilizers which were sensitive to surface runoff and volatilization, produced greater weed problems, and placed fertilizer where it was less available to the crop.

This invention can help the farmer by reducing the amount of fertilizer and herbicide required to raise a crop, help increase the amount of moisture available for propagation of the crop, and increase the crop yield while at the same time decreasing the expense of fuel and labor required to raise the crop. Significant improvement in plant growth has been observed by use of the method and apparatus of this invention. Significant reductions in surface water runoff and loss of soil and nutrients are evident.

While the field of this invention is crowded with many inventions directed toward the planting and fertilizing of crops, and the invention itself may appear to be a minor change from the prior art, the equipment required to practice the invention was not available prior to this invention, nor was the method described in any of the prior art. The method departs from "conventional wisdom" in many ways. The results obtained by the application of this invention to farming of small grain crops are very significant, especially when one considers that only a small reduction in input cost or a small increase in yield can make the difference between a profitable farming operation and a bankruptcy.

BRIEF DESCRIPTION OF THE DRAWINGS

The preferred embodiment of this invention is illustrated in the accompanying drawings, in which:

FIG. 10 is a side view of a standard residue knife with cross section indicated as C—C'.

FIG. 10A is a cross section view of the standard residue knife illustrated in FIG. 10 at section C—C'.

FIG. 10B is a vertical section view illustrating the effects on the soil of the soil effect of the standard residue knife. The soil profile shows the effect of a standard residue knife.

FIG. 11 is a side view of a low-disturbance residue knife with cross section indicated as D—D'.

FIG. 11A is a cross section view of the low-disturbance residue knife illustrated in FIG. 10 at section D—D'.

FIG. 11B is a vertical section view illustrating the effects on the soil of the soil effect of the low-disturbance residue knife. The soil profile shows the effect of a low-disturbance residue knife.

FIG. 12 is a side view of a high-disturbance furrowing knife with cross section indicated as E—E'.

FIG. 12A is a cross section view of the high-disturbance furrowing knife illustrated in FIG. 10 at section E—E'.

FIG. 12B is a vertical section view illustrating the effects on the soil of the soil effect of the high-disturbance furrowing knife. The soil profile shows the effect of a high-disturbance furrowing knife.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Method

The method of seeding and fertilizing which is the subject of this disclosure is referred to as "cross row feeding" of agricultural crops. The term cross row feeding as used in this disclosure shall refer to relatively close alignment of seed rows and fertilizer bands to promote and allow each seed row to access more than one fertilizer band, thus improving the growth and production of the crop.

This disclosure relates to an improved method for placement of seeds and fertilizer with respect to no till seeding procedures, but it is to be understood that the field can be one that has been previously tilled or prepared for seeding in instances where no till or minimum tillage procedures are not being utilized.

This disclosure is directed to an agricultural system for seeding and fertilizing agricultural crops. Crops with branching root systems which can best utilize the teachings of this invention.

The method described herein relates to placement of deep banded fertilizer and seed while seeding agricultural crops in multiple groups of rows during a single pass across a field area.

This method involves the step of placing fertilizer deep banded below the seed. Each seed row has a deep band of fertilizer associated with it. The fertilizer bands and seed rows are arranged such that each seed row may access more than one band of fertilizer by virtue of the close positional proximity and alignment of seed rows with fertilizer rows, as shown in FIGS. 1, 2, 3, 5, and 6.

Figure 3:
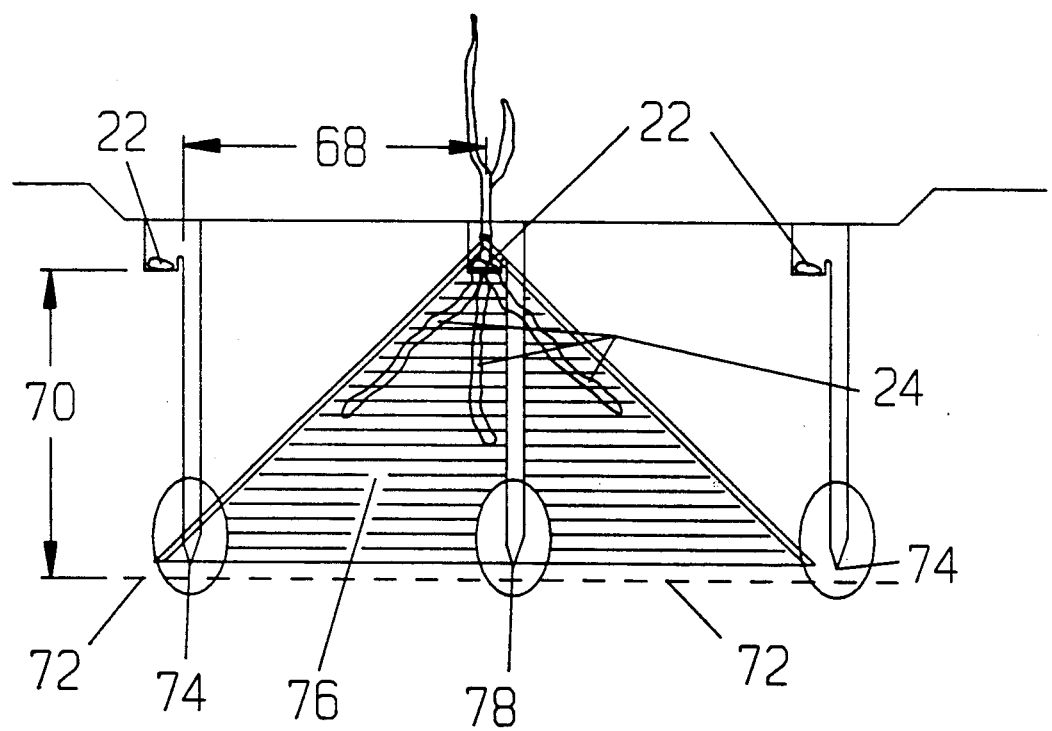
FIG. 3 is a schematic vertical section view illustrating the placement of seed and fertilizer inside a rooting cone dimensioned to illustrate the outer and most optimum boundaries of placement of immobile fertilizer.

This method is designed specifically for improving the growth, performance and production of crop plants with branching root systems in which typically, three to six seminal, or initial roots grow outward and downward from the seed at an angle of 30 to 45 degrees from the vertical, as illustrated in FIG. 3. These root systems take on an approximate right-circular conical shape with an included angle of 60 to 90 degrees and with the apex at the seed location. At a diameter of approximately 8 inches, the roots proceed approximately vertically downward.

Figure 4:
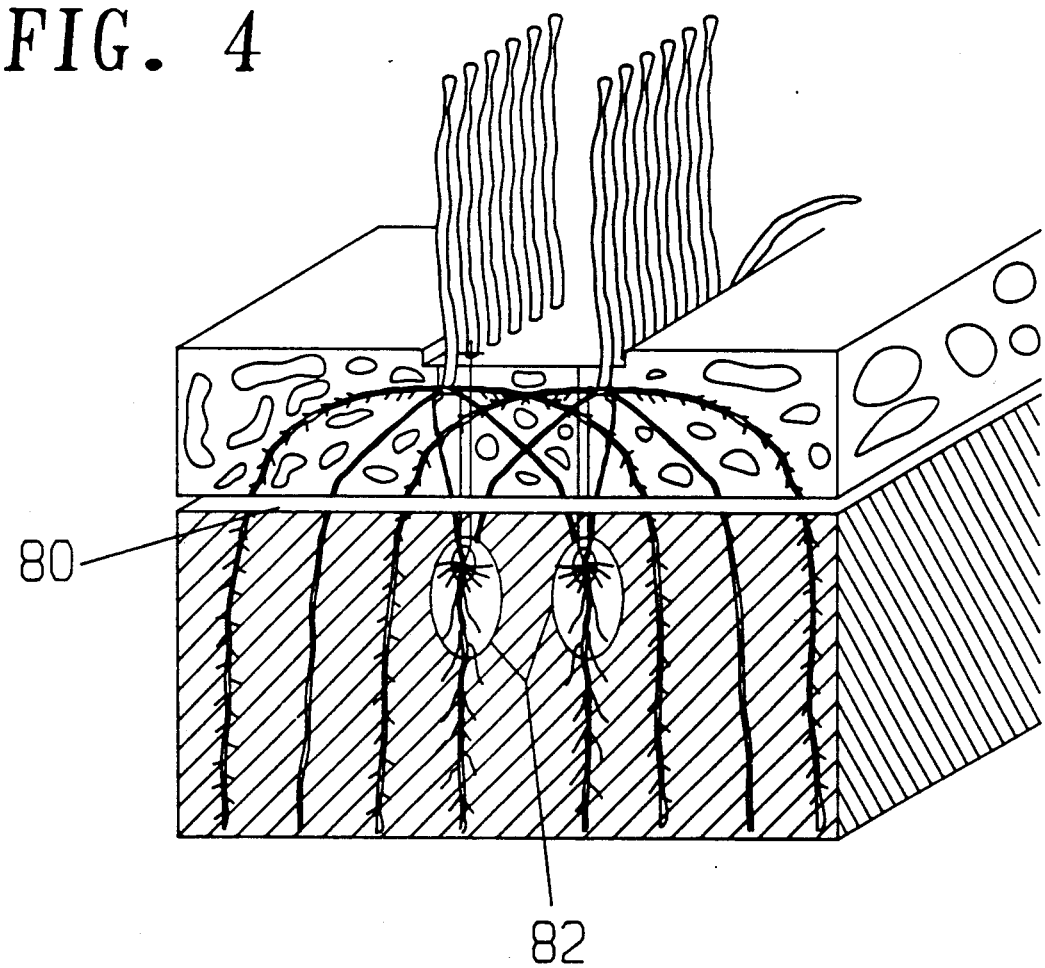
FIG. 4 is schematic perspective view with a vertical soil section illustrating residual bands of fertilizer in a harvested crop using a minimum tillage operation above the old residual bands which results in a certain degree of weed control as accomplished by means of a root severing device.
Figure 5:
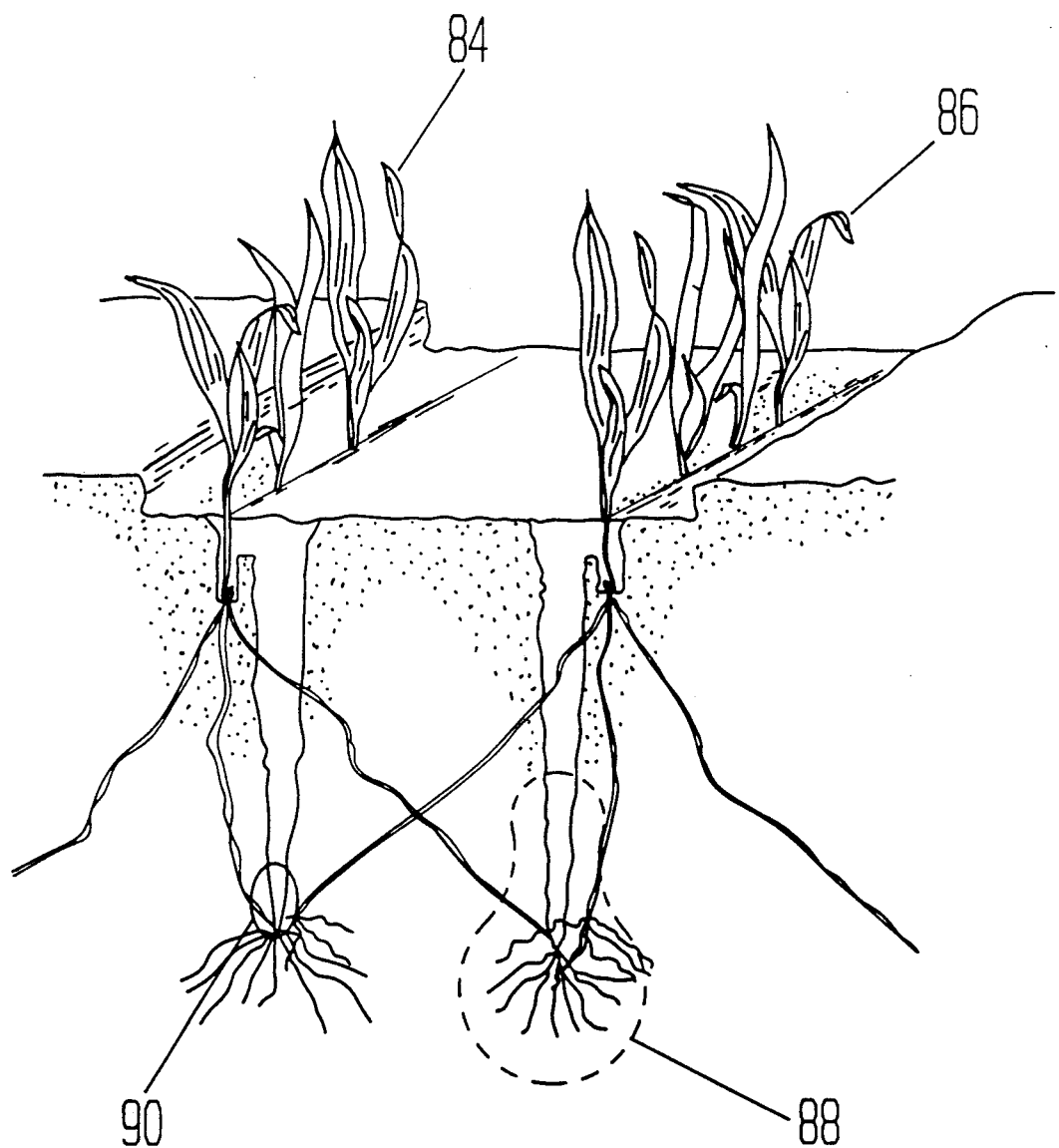
FIG. 5 is a schematic perspective view with a vertical soil section illustrating placement of seed and fertilizer of various concentrations and various plant food elements in a calcareous soil type requiring highly concentrated bands of P and K and a highly concentrated band of nitrogen.

Later in their development, these crops produce a secondary branch rooting system that proceeds from the crown of the root system, outward and downward to further explore a greater soil profile and harvest moisture and nutrients, as illustrated in FIG. 4. While these roots will locate and consume fertilizer placed in the ground outside the rooting cone, the fertilizer placed within the rooting cone will be most beneficial within the critical first 30 days or so after germination.

Most annual crops consume 70% of the immobile phosphate in the first 30 days of the plant's life, during which the first few seminal roots are in their early stage of growth. This is well before secondary roots develop, so therefore, positional availability of phosphate for seminal roots can be greatly enhanced by providing more than one phosphate feeding site. Further, it has been proven that phosphate efficiency goes up when mobile N, and to some extent, immobile K is included in the fertilizer band. However, N at higher rates and concentrations can actually delay phosphate uptake due to the effects of high salt and low ph.

Nitrogen leaching effects are less pronounced in the soil profile if the N bands are more concentrated. If the rate per acre remains the same, nitrogen will remain at a higher elevation in the soil profile through the wet winter months if the fertilizer band spacing is moved from 10" centers to 20" centers at the time of fall application. This new method of fertilization allows all seed rows to access highly concentrated, fall applied N bands in winter crop production. The same method also allows the same seed rows to access dilute bands of NPKS. Thus one band can carry the full nitrogen charge of anhydrous ammonia (NH$_3$) and the closely aligned seed rows with their primary bands will carry a dry or liquid formulation of immobile nutrients. Thus all the rows will cross row feed. All rows will access the highly concentrated nitrogen (ammonia) band and all rows can access the adjacent band of diluted NPKS.

There are three major effects from cross row feeding:
1. Concentration of N for fall seedings and nonconcentration of N for spring seeding.
2. Improved phosphate efficiency by providing more than one feeding site deep in the soil profile.
3. NPKS bands are deeper, allowing minimum tillage to occur without destroying old fertilizer bands.

Figure 8:
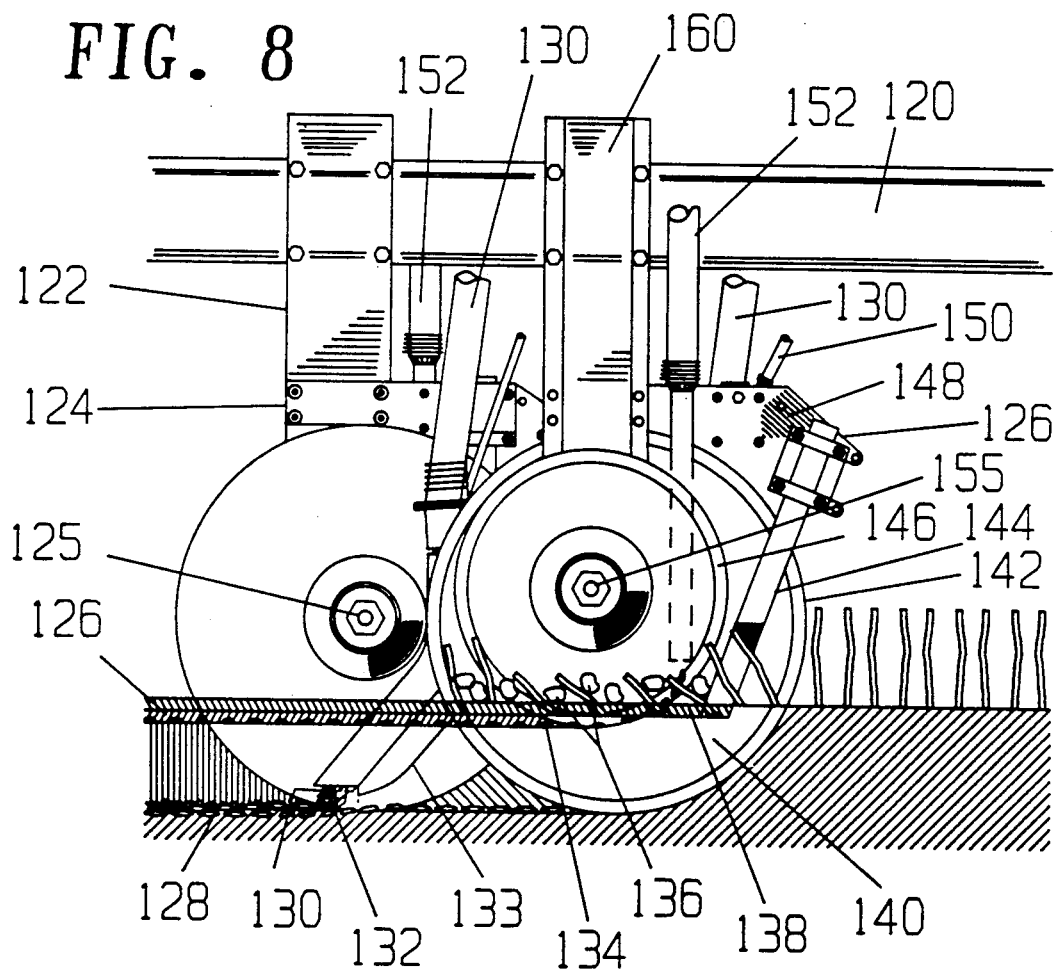
FIG. 8 is a side elevational view of two openers mounted to a tool bar. One opener is designed to throw residue to the right and fertilize on the left side. The other opener is designed to throw residue to the left and fertilize on the right side.

An apparatus has been developed to make cross row feeding economically efficient. The apparatus meets specific needs required to cross row feed. The soil opening apparatus is a combination of at least two soil openers shown in FIG. 8 and FIG. 9. The soil openers shown in FIG. 8 are closely aligned approximately 4" apart, side to side. The opener must operate in high residue at high speed with no machine plug-ups. The openers must place seed on unfractured soil with no surface organic residue present in the seed rows. Copious toxic amounts of NH$_3$ and dry NPKS must be placed at high speed in close proximity to each seed row, and immediately sealed in place by a soil covering means to prevent the gaseous NH$_3$ component from reaching the seed in concentrations sufficient to prevent effective germination.

Figure 1:
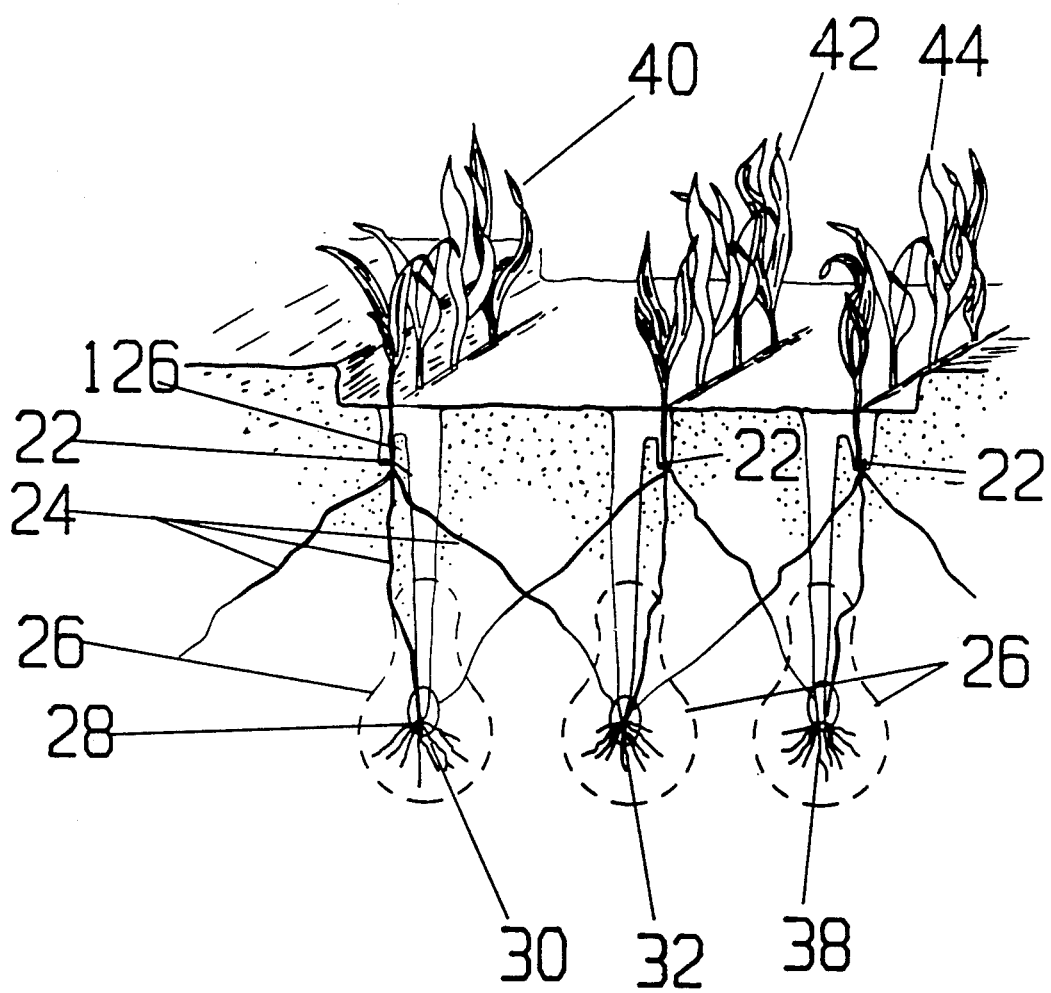
FIG. 1 is a schematic perspective view with a vertical soil section illustrating the placement of seed and fertilizer and how a growing crop is able to access multiple bands of fertilizer.

Seeding of agricultural crops using a method of fertilizer placement and seed row alignment which allows plants with branching root systems to access multiple bands of plant food fertilizer is illustrated in FIG. 1. This system of feeding agricultural crops is referred to as cross row feeding.

Seed 22, FIG. 1, of an agricultural crop is placed in seed rows 40, 42, 44 FIG. 1. A minimum of two rows arranged according to this method producing a field wide effect. For illustrative purposes three rows are shown, but it is understood that the machinery would seed a substantial number of rows at the time of seeding. At the time of seeding, the seed 22 and the plant food fertilizer is simultaneously placed in mobile bands 26, and immobile bands 30, 32, and 38 and arranged so that the seminal roots 24 from one seed row may access multiple bands of fertilizer 26, 30, and 32. The concentration profile of the mobile fertilizer is illustrated schematically by the broken line 26 in FIG. 1. The plant food is primarily made up of mobile nitrogen 26 and immobile phosphate and potash 28. Since nitrogen is consumed at much higher rates by non legume plants it has been determined that it is most desirous to place the nitrogen 26 well below the seed 22 in the soil profile. The rate (lb/acre) of nitrogen 26 actually applied can be five to six times greater than the applied rate of phosphate and potash. Since the nitrogen can be applied in the form of gaseous anhydrous ammonia, it is important to place the ammonia, urea or nitrate nitrogen well below the seed to prevent loss to the atmosphere and damage to the seed. A column of $NH_3$ immediately combines with soil moisture to form a horizontal band column of $NH_4$ as represented by the broken line profile 26 in FIG. 1. The column of $NH_4$ 26 alters the soil chemistry by lowering the soil ph, making the soil more acid. As the soil ph is lowered in the band, certain chemical reactions occur which alter the plants ability to take up additional plant food nutrients. This phenomenon occurs when increased nitrogen rates produce a critical level of salt concentration. Therefore, it has been determined that if bands of $NH_3$ are applied in the soil in narrow deep unconcentrated bands 26, the efficiency of plants using the total fertility of NPK 26, 28 is greatly increased due to positional chemical and moisture availability.

Nitrogen can be applied in gaseous, liquid or solid form, the liquid/gaseous anhydrous form being typically the lowest cost per pound of N. All forms are useable and are preferred to be placed in deep bands 30, 32, and 38. Nitrogen as $NH_3$ or $NH_4$ is extremely toxic to the seed. $NH_3$ forms of nitrogen are typically lower cost and are preferred to be placed in deep bands. In the past, low band concentrations were possible to achieve by applying the NPKS in the seed row 40, 42, 44 which prohibited the use of volatile anhydrous $NH_3$ formulation. Seed row applied fertilizer lowers germination and causes root colony development at a high elevation in the soil which decreases yields in drought conditions. A new method was discovered which solves these problems and provides new opportunities for higher yields and plant efficiency with low cost fertilizer formulations. The new method discovered allows multiple seed rows 40, 42 and 44, to access multiple bands of fertilizer 30, 32, and 38 below the seed by simply bringing the rows 40, 42, and 44 closer together. The branching initial seminal roots shown schematically in FIG. 3 along with additional secondary bands 74 FIG. 3 of adjacent seed rows at a horizontal distance 68 of approximately 4 inches away from the seed 22 FIG. 3 center and at a distance 70 of approximately 4 inches below the seed 22 FIG. 3 before it begins a vertical descent into the soil profile. At the point that the roots begin the vertical descent is where the optimum point of placement 72 of immobile fertilizer 74, 78. The volume of soil under the seminal roots extending out to the radius of vertical root descent is called the rooting cone 76. The depth 70 of the rooting cone is determined by the beginning of the approximately straight vertical descent of the agricultural crop's root system. The base 72 of the rooting cone defines the best acceptable target for the seeded crop. At this elevation in the soil the planting can take advantage of the genetic root design, the more consistent moisture, germination safety and less volatilization of volatile $NH_3$ ammonia.

Future agricultural crops will also find deep fertilizer bands FIG. 4 82 more readily accessible under minimum till or no till situations since the old residual bands 82 will also provide maximum positional availability to each new crop and are located well below the minimum tillage layer 80. This new method of raising an agricultural crop with a branching root system provides many new opportunities to improve yield and fertilizer efficiency.

Since the plant root system can access plant food from two or more site locations it is now possible to increase the nitrogen efficiency for certain crops such as winter wheat, winter canola (rape), winter barley, winter rye and still use the same apparatus to place fertilizer.

For winter crops it has been determined that the more concentrated the band of $NH_4$ becomes, the less likely the nitrogen will convert to mobile nitrate $NO_3$. Concentrated wide band spacing keeps bands highly concentrated with a low ph, high salt load which delays the nitrate bacteria from converting the band of $NH_4$ to $NO_3$. Wide concentrated bands expose the nitrogen to less soil area. In other words, the feeding sites are reduced for the nitrate bacteria to convert the soil stable $NH_4$ into the soil mobile $NO_3$ form. The soil mobile nitrate follows the wetting front of moisture, moving downward in the soil. In areas of heavy rainfall where nitrate conversion has occurred, nitrate will move downward in the soil. It is possible for the fall applied nitrogen to leach from the top six feet of the soil profile. Nitrates found below six feet will eventually move into the groundwater causing greater environmental concern.

Figure 2:
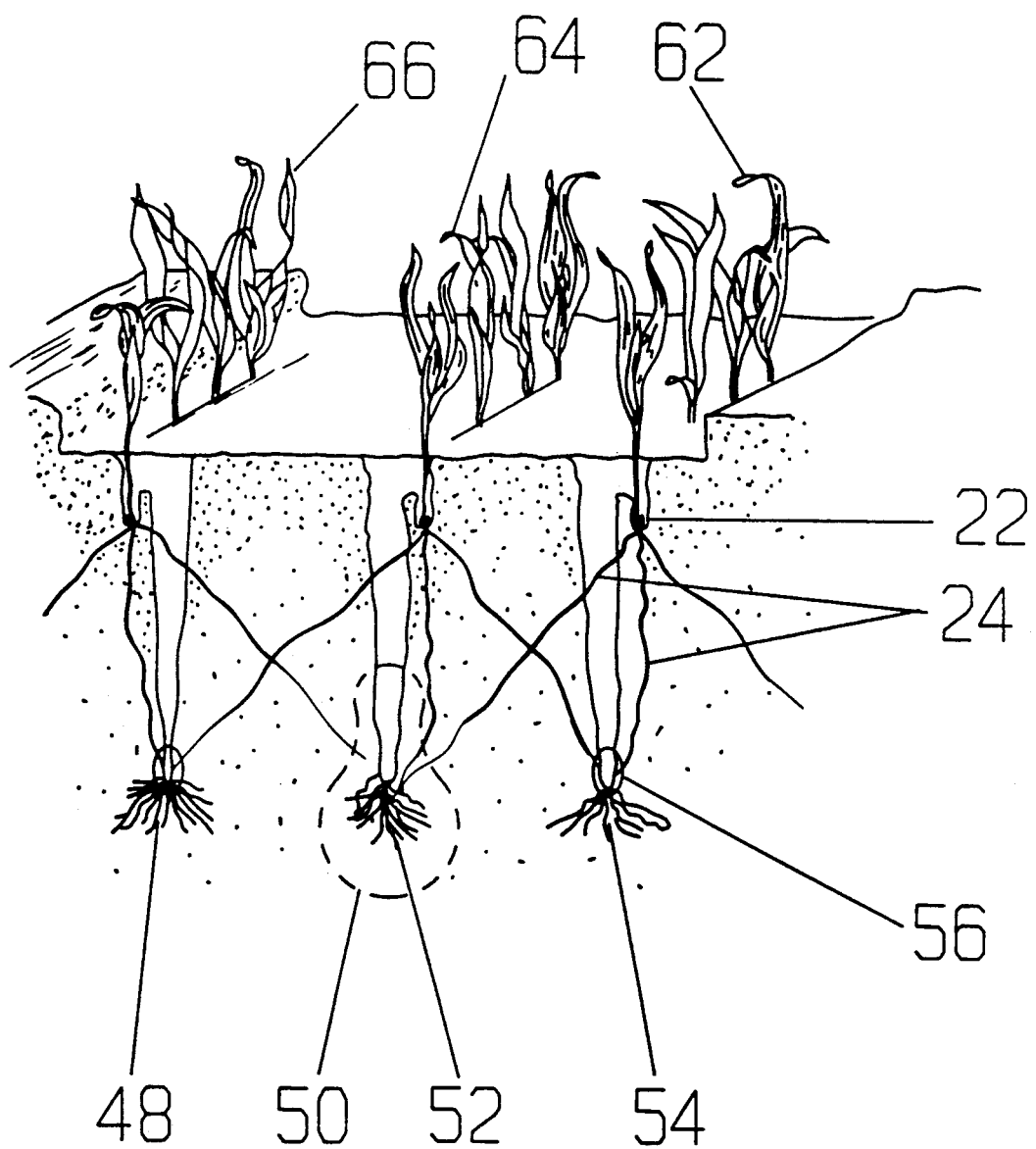
FIG. 2 is a schematic perspective view with a vertical soil section illustrating the placement of seed and fertilizer in various concentrations allowing one seed row to access multiple bands of fertilizer or different band concentrations.

The method of cross row feeding as illustrated in FIG. 2 overcomes the problem of leaching of nitrates. Seed row 64 and its primary band of nitrogen fertilizer 52 is joined by one or more seed rows 62, and 66. Rows 62 and 66 are closely aligned to row 64 so as to allow the branching roots to access multiple bands of fertilizer 48, 52, and 54. Row 66 band of fertilizer 48 contains adjunctive blends of ammoniated phosphate and potassium chloride which are immobile and do not significantly alter the soil ph or create an excessive salt load due to the relative concentration. Row 62 and its primary fertilizer band 54 would carry a similar concentration 56 of adjunctive blends of ammonium phosphate and potassium chloride which are considered as immobile P and K. The result of this method of feeding plant roots is that all rows are allowed to access a highly concentrated band 50, 52 of $NH_4$ (applied as $NH_3$) and $NO_3$. The more concentrated band 52 and the band column 50 significantly lessens the possibility of conversion to nitrate and $NO_3$ thereby reducing leaching into the groundwater. The band 52 is positional and chemically available for all the seed rows 62, 64, and 66 to access. This method allows the crop root system to feed on nitrogen, phosphate, and potassium and keeps the mobile nitrate from moving below the six foot root zone of the plant by virtue of the benefits of this new cross row feeding method of raising agricultural crops.

This new method of feeding agricultural crops improves fertilizer efficiency in soils with high calcium carbonate. Since each seed row 84, 86 is allowed to access two or more deep bands 88, 90 of fertilizer it is now possible to produce a highly concentrated band of phosphate and potash 90 which is accessible to two or more seed rows 84, 86. The concentration of immobile phosphate potash band allows a higher availability of phosphate in a soil high in calcium carbonate (high ph), the adjacent band 88 of the adjacent row 86 can also be highly concentrated with nitrogen only to lessen leaching of nitrate below the root zone.

Figure 6:
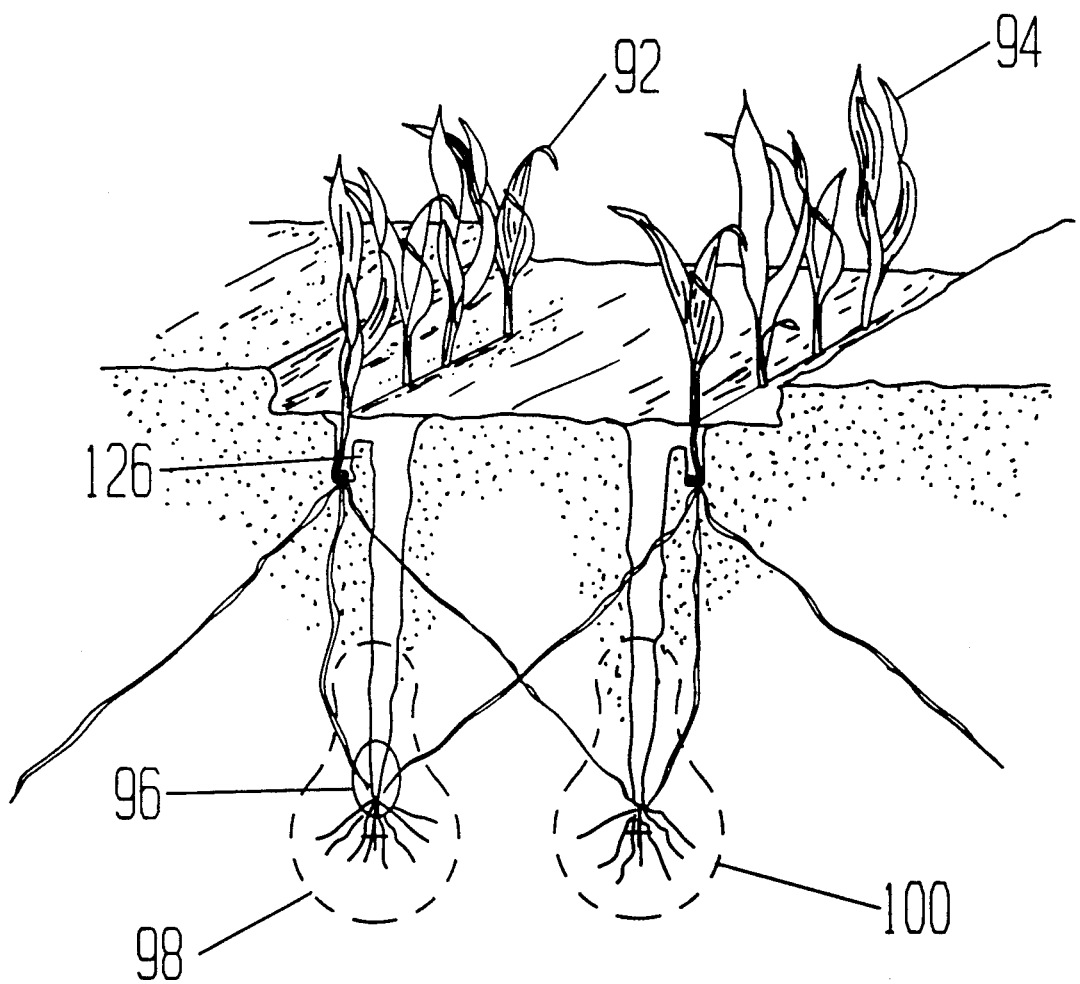
FIG. 6 is a schematic perspective view with a vertical soil section illustrating placement of seed and fertilizer of various concentrations and various plant food elements in a calcareous soil type requiring heavily concentrated bands of P and K and dilute bands of nitrogen using a new method of feeding crops called cross row feeding.

The method of cross row feeding can also be used to produce higher spring crop yields in calcium carbonate soils. This is illustrated in FIG. 6 and accomplished by placing immobile P and K in one band 96 of highly concentrated plant food. Each band 98, 100 receives an equal charge of mobile nitrogen of a lesser concentration. This improves spring crop access to nitrogen and provides P and K in a very concentrated band 96 lessening calcium tie up of phosphate. Row 92 is able to access its primary band of plant food 96 and 98 and it can also access the adjacent band 100 of primarily nitrogen placed fertilizer. Row 94 access its primary band 100 of nitrogen fertilizer and it also accesses the adjacent secondary band 96 of phosphate and potash fertilizer. Band 96 also has a column 98 of nitrogen fertilizer which is dilute and improves overall efficiency of NP and K.

Tap Rooted Crops

Figure 7:
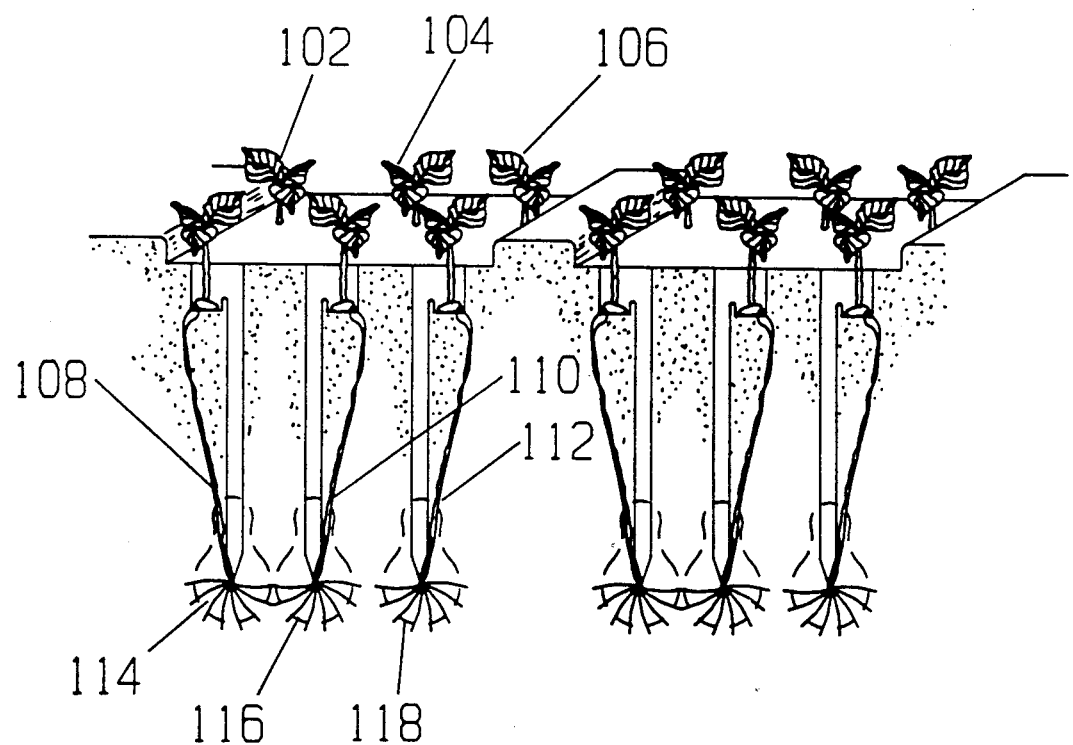
FIG. 7 is a schematic perspective view with a vertical soil section illustrating placement of seed and fertilizer with a taprooted crop that does not cross row feed.

This new method of seeding and fertilizing agricultural crops does not apply to tap rooted crops. The crop seeded must have a branching root system that proceeds downward and away from the seed at an angle of 30 to 45 degrees from the vertical. This branching root system is referred to as a seminal root system. Annually produced agricultural crops consume some 70 percent of the needed phosphate within the first 30 days following germination. Therefore, branch roots from tap rooted plants will never reach adjacent row bands of NPK in the critical period of high phosphate consumption. FIG. 7 illustrates tap rooted crops' genetic root patterns. Each plant in the seed row 102, 104, 106 produces a vertical tap root 108, 110, 112. Tap roots do not wander through the soil looking for nutrients and/or propagate preferably in a tilled area. The roots respond to a genetic function called geotropism which causes the root to follow the pull of gravity and proceed generally downward from the seed. Therefore, bands 114, 116, and 118 of fertilizer must be placed slightly to the side of the vertical descent whereby the fine hair roots of the tap roots access only one band of fertilizer as illustrated by seed row 102 accessing only deep band 114 by taproot 108.

Based on certain research carried out by the inventor it was determined serendipitously and independently that rows of wheat would access adjacent fertilizer bands in addition to their own fertilizer bands in the phosphate critical initial 30 day period following germination providing the deep bands and seed rows were properly aligned and dimensioned.

It was determined that this method could be further demonstrated to the inventor and others on a field wide basis with development of a new seeding and fertilizing apparatus for extremely narrow seed row spacing. This new method was first demonstrated on a field wide basis by the inventor using the special seed opener which makes multiple fertilizer band access of multiple seed rows possible.

This new method of seeding agricultural crops is further supported by the apparatus. The apparatus implements and enhances the method.

Apparatus

Figure 9:
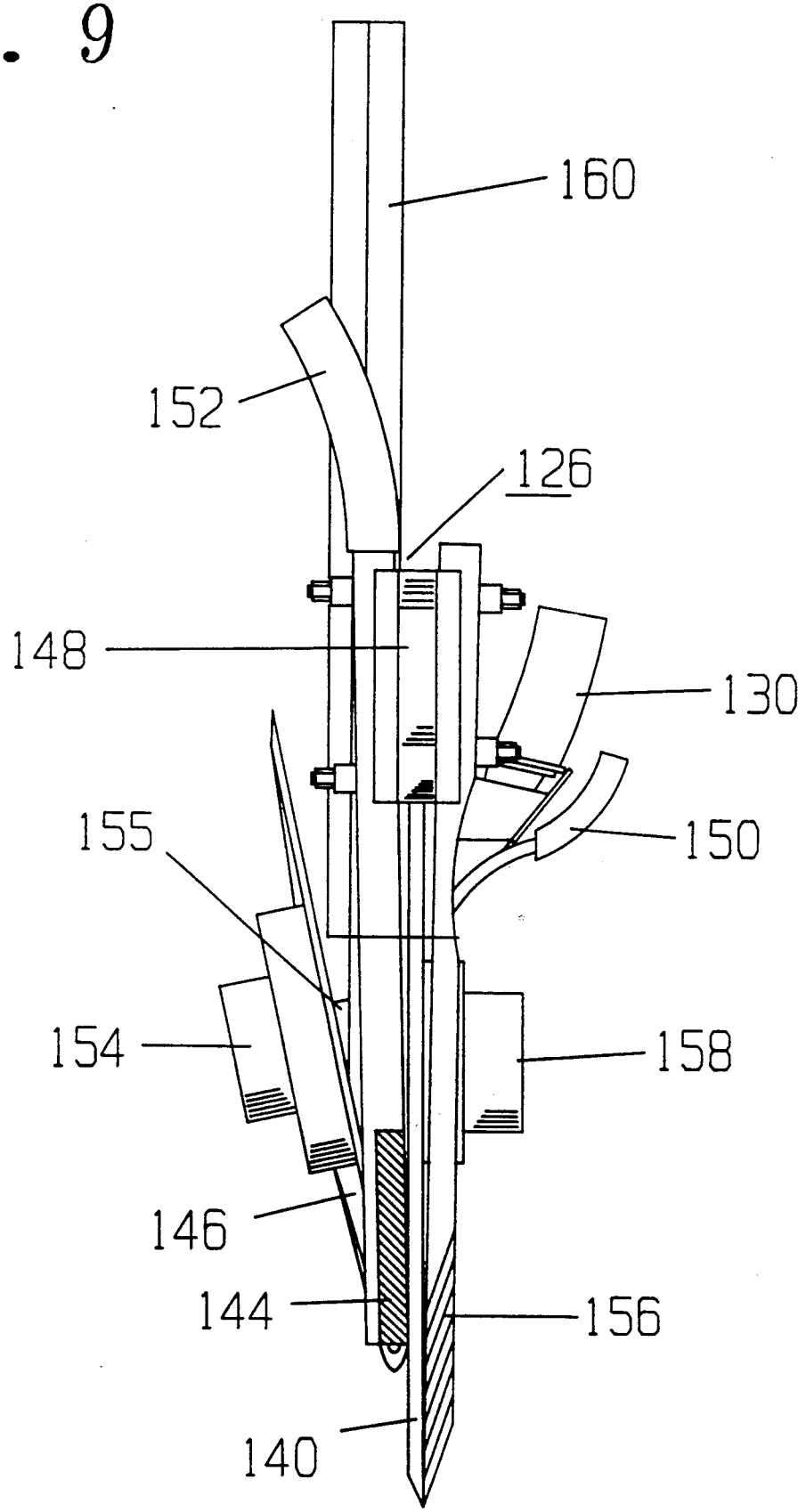
FIG. 9 is a front elevational view of a right-hand opener designed to move residue to the right side of the opener as viewed from the front.

The soil opening apparatus shown in FIG. 8 and FIG. 9 is comprised of a standard 160 which is mounted to a tool bar 120. The tool bar 120 transfers the weight of the machine and the pulling forces into the standard 160. The primary applied forces are transferred to the spindle 125, 155 and hubs 154, 158 into the rotating deep running blade 140. The deep running blade 140 engages the soil to approximately deep band 128 depth of approximately 6 inches or whatever is required for the crop. Since two or more openers are required to be closely spaced for the practice of this invention, a left hand opener assembly 122 is combined with a right hand opener assembly 126. A right hand opener assembly 126 will move residue 136 to the right side of the opener, and a left hand opener assembly 122 will move residue to the left of the opener. A resultant effect of this opener combination is improved residue flow through the drill lessening the chance of gathering the residue into a mass which would plug up the space between the openers and thereby prevent the proper operation of the assembly.

Ranking, or placing adjacent opener assemblies 122 and 126 one ahead of the other is important to prevent interference and plugging.

Both opener assemblies 122 and 126 shown in FIG. 8 use a swept back slipperfoot shank 156, 133 which enables placement of dry NPK 130 and ammonia 132 fertilizer to the side and below the seed furrow 134. A gas and liquid mixture of $NH_3$ is introduced from a dispensing means (not shown) into the opener assembly through ammonia tubing 150. The slipperfoot shank 156, 133 produces virtually no soil disturbance at the surface and allows the openers 122 and 126 to run closely together without plug-up. This close alignment of openers 122 and 126 facilitates the method of cross row feeding and significantly reduces machine cost and makes possible the placement of seed and application of fertilizer in one pass thereby reducing costs.

Each opener has a seed tube 152 which conveys seed from a dispensing means (not shown) and releases the seed into a seed placement device as shown as a rotating compound angle disc 146 which is rotatably fastened to standard 160 which disc opens a seed furrow 134 on the unfractured soil shelf 138. The rotating seed furrowing disc is mounted to an oil filled hub 154 and the hub is rotatably fastened to angled spindle 155 which is mounted to the standard 160.

A tool holder means 148 is mounted to the standard 160. For left and right hand assemblies, a left hand tool holder 148 and a right hand tool holder 124 are required. The tool holder adjustably supports the slipperfoot fertilizer shank 156, the seed tube 152, the residue knife 144 in vertical alignment with the deep running blade 140 and angled backwards from the direction of travel to facilitate soil and debris flow 136. The residue knife 144 is located behind the edge 142 of the deep running blade 144. The deep running blade cuts and parts the surface debris and the soil. Since the knife 144 is located behind the soil fracture point it will cause the surface residue 136 to flow to one side only. The close alignment of the knife 144 and the deep running blade 140 prevents residue from being trapped between the blade 140 and the residue knife 144. Located directly behind the residue knife 144 is the seed furrowing disc 146. The close proximity of the furrowing disc 146 to the residue knife 144 and the forward speed of the machine prevents residue 136 from falling back into the path of the furrowing disc 146.

As shown in FIG. 8, the soil shaving residue knife 144 operates in the soil close to the surface, moving surface debris and soil 136 to the side of and away from the seed bed. The soil shelf 138 is further enhanced with a raised soil berm 126 formed by the rotating furrowing blade 146. The raised soil berm 126 is also indicated in FIGS. 6 and 9.

The rotating furrowing disc 146 removes a second soil layer and places seed in a residue free, moisture laden zone in the seed furrow 134.

The apparatus as shown in FIG. 8 and FIG. 9 facilitates the method of cross row feeding since it can dynamically handle large amounts of residue at high speeds. As ground speeds increase soil will move a greater distance by the soil shaving residue knife 144.

Thus, for varying conditions of planting speed, it is useful to have available soil shaving residue knives of various arrangements. The residue knife in FIG. 8 and FIG. 9 must be modified as said conditions, crop requirements and ground speed changes. FIGS. 10, 11 and 12 together with FIGS. 10A, 11A and 12A illustrate three types of residue knives, and FIGS. 10B, 11B, and 12B illustrate the effect of each of the three types of residue knives on the soil profile in the planting zone.

The standard knife 162 moves soil and surface residue 166 to the side of seed row 168. The knife uses a flat initial angle of 15 to 18 degrees which develops into a parabolic curve 164.

The knife 162 is mounted at an angle of 15 to 25 degrees to the vertical direction such that the lower end trails the upper end.

The low disturbance knife shown in FIG. 11 illustrates a flat angle knife 170. The knife causes very little surface disturbance 172 and yet facilitates placing seed 22 in nontoxic, residue free soil.

The knife 170 is also mounted at an angle of 15 to 25 degrees to the vertical direction. A sharpened leading edge forms a wedge angle of 12 to 18 degrees for causing soil and residue to flow outward and away from the deep running disk 140.

The deep furrow knife 176 illustrated in FIG. 12 removes considerable soil and creates a deep furrow 180 effect across the land. Seed 22 rests deeper in the soil with no organic residue present. The knife uses an extension 178 to create a significant tillage effect and considerable soil movement at slower speeds.

The vertical angle and initial wedge angle are preferably within the range of 15 to 25 degrees and 15 to 18 degrees, respectively.

Figure 13:
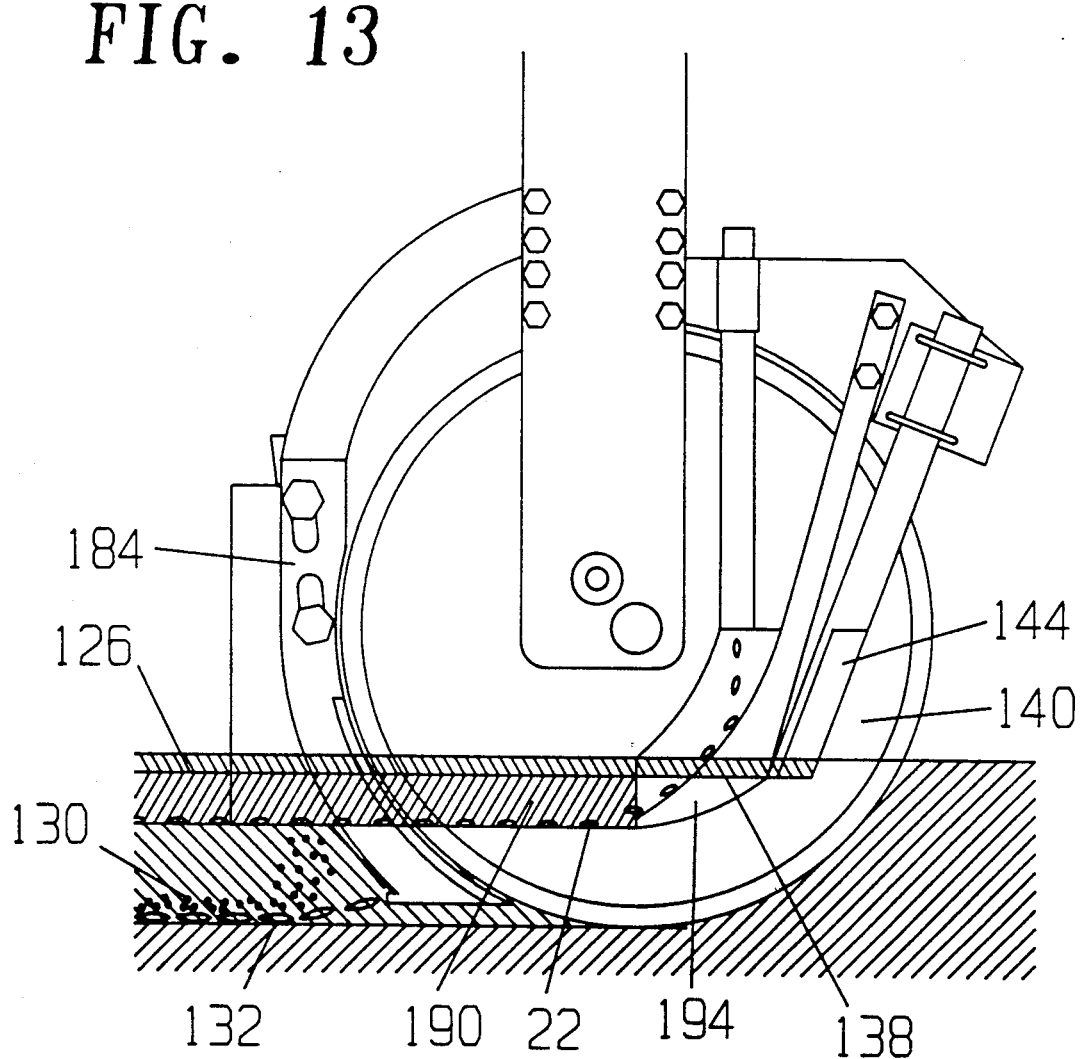
FIG. 13 is side elevation view of a seed and fertilizer placement opener utilizing a soil shaving knife, a slipperfoot seed furrowing device, and a trailing radius knife for the purpose of placing fertilizer in the bottom of the deep band slot.

FIG. 13 represents a modification of the opener. The rotating deep running disc 140 in combination with residue knife 144 cleans a residue free path. The slipperfoot seed furrowing placement device 194 penetrates the soil shelf 138 created by the knife 144. The seed slipperfoot 194 places seed 22 in a seed furrow 190. A radius shank 184 places dry NPK 130 and liquid 132 fertilizer in a soil slot directly behind the deep running blade 140.

Having illustrated and described the principles of my invention with reference to one preferred embodiment, it should be apparent to those persons skilled in the art that such invention may be modified in arrangement and detail without departing from such principles.

I claim as my invention all such modifications as come within the true spirit and scope of the following claims:

1. A method of seeding agricultural crops with branching root systems comprising the steps of:
   (a) placing seed in a plurality of elongated furrows forming a plurality of substantially parallel seed rows;
   (b) placing fertilizer in a plurality of bands parallel with, adjacent to, and generally directly below each of the seed rows;
   (c) covering the seed with soil and closing the fertilizer band openings;
   the seed rows and fertilizer bands arranged such that the seminal roots from each seed row will share access to multiple bands of fertilizer whereby efficiency of fertilizer utilization, plant growth and productivity are improved.

2. The method as described in claim 1 wherein seed of agricultural crops with branching root systems is placed in the seed rows while simultaneously placing bands of fertilizer below the seed rows.

3. The method of claim 1 further including removal of surface residue, soil active chemicals and dry soil from above the seed row prior to opening of the seed furrows.

4. The method as set out in claim 1 wherein said seed is placed on substantially undisturbed soil at the bottom of the seeding furrow for the purpose of providing continuous capillary moisture flow to the seed, and to achieve improved isolation of the seed from high concentrations of fertilizer which may be toxic to the plant in its early stages of development.

5. The method as set out in claim 1 wherein said bands of fertilizer are placed in the soil at a depth below a tillage depth and arranged so that residual bands of fertilizer are undisturbed when tillage occurs, whereby access of fertilizer is enhanced for existing crops and also for future crops.

6. The method of claim 1 wherein different fertilizer types and concentrations are applied in adjacent fertilizer bands whereby varying soil types, moisture conditions and crop needs may be accommodated and whereby incompatible fertilizer types may be used together.

7. The method as set out in claim 6 wherein one fertilizer band is of highly concentrated nitrogen with diluted concentrations of phosphate and potash and the adjacent band is of diluted concentrations of phosphate and potash whereby improved productivity and reduction of nitrate leaching are accomplished in fall seeded crops.

8. The method as set out in claim 6 in which one fertilizer band is of a concentrated nitrogen formulation and the adjacent fertilizer bands are of diluted phosphate and potash nutrients, thereby reducing mobility in the soil profile of the more highly concentrated nitrogen band, and improving the shared accessibility of the nitrogen fertilizer band with adjacent seed rows for the purpose of improving growth and productivity of fall seeded crops.

9. The method as set out in claim 6 wherein one band of fertilizer is composed of highly concentrated nitrogen fertilizer and an adjacent fertilizer band is highly concentrated in phosphate and potash based fertilizer.

10. The method as set out in claim 1 in which dilute nitrogen is placed in all of the fertilizer bands along with immobile phosphate and potash.

11. An apparatus for seeding agricultural crops with branching root systems comprising:
   (a) a plurality of furrowing means for forming elongated furrows in the soil;
   (b) a plurality of means for placing seed in the elongated furrows resulting in substantially parallel seed rows in corresponding seed furrows;
   (c) a plurality of means for placing fertilizer in bands parallel with, adjacent to, and generally directly below each of the seed rows;
   (d) a means for covering the seed with soil and closing the fertilizer band openings;
   the plurality of furrowing means, the plurality of means for placing seed and the plurality of means for placing fertilizer being sufficiently close together that seminal roots from each seed row will share access to multiple bands of fertilizer, whereby the efficiency of fertilizer utilization is improved, and plant growth and productivity are enhanced.

12. The apparatus of claim 11 in combination with a framework means on which are mounted the plurality of means for placing seed, the plurality of means for placing fertilizer and the means for covering the seed with soil and closing the fertilizer band openings, the framework means being forced to move overtop the surface of the soil by a propelling means.

13. The apparatus of claim 12 in combination with a plurality of deep-running rigid circular discs, rotatably fastened to said framework means and aligned substantially parallel with the direction of travel and at substantially right angles to the surface of the soil and forced to rotate by the forward motion of the apparatus and engagement with the soil, whereby openings can be formed in the soil.

14. The apparatus of claim 13 wherein one of said deep-running rigid circular disks is associated with each of said furrowing means.

15. The apparatus of claim 14 in which each furrowing means is arranged to form a raised berm of soil between its corresponding seed furrow and a still-open opening formed by said deep-running rigid circular disc for the purpose of trapping the seed and preventing the seed from falling into the opening formed by said deep-running rigid circular disc and also for the purpose of protecting the seed from excess concentrations of toxic volatile fertilizers.

16. The apparatus of claim 13 in which means for placing fertilizer places fertilizer in the openings caused by said deep-running rigid circular discs.

17. The apparatus of claim 13 in which said plurality of furrowing means includes a second plurality of rigid circular discs rotatably fastened to said framework means with their axes of rotation at compound angles to the common direction of axes of rotation of said deep-running rigid circular discs and arranged to move soil away from said deep-running rigid circular discs and form furrows therebeside with seed-trapping raised berms between the deepest parts of the seed furrows and still-open openings formed by said deep-running rigid circular discs, the bottom of the seed furrows comprised of firm, moist, and undisturbed soil.

18. The apparatus of claim 11 in which said means for covering the seed and closing the fertilizer band openings places soil overtop the seed and the openings in the soil caused by the deep-running discs.

19. An apparatus for placing seed and fertilizer for the purpose of planting an agricultural crop comprising:
   a mobile framework which is forced to move overtop the surface of the soil by a propelling means in a direction of forward motion thereby defining a leading and trailing direction;
   a plurality of soil opening devices adjustably mounted on said mobile framework by means of subframe means, each soil opening device further comprising:
      a single deep-running rigid circular disc rotatably mounted to said subframe means and forced to turn by engagement with the soil and the forward motion of the framework means for the purpose of opening a substantially vertical slot in the soil;
      a seed furrowing device rigidly attached to said subframe means and located beside said deep-running rigid circular disk for the purpose of opening a seed furrow;
      a seed placement means rigidly attached to said subframe means and located immediately trailing said seed furrowing device for the purpose of placing seed in the seed furrow;
      a fertilizer placement means rigidly attached to said subframe means in close proximity to said deep-running rigid circular disc for the purpose of placing fertilizer in said vertical slot in the soil; generally directly below the seed furrow and,
   a seed storage and dispensing means mounted on said mobile framework for the purpose of delivering a stream of seeds to said soil opening devices; and,
   a fertilizer storage and dispensing means mounted on said mobile framework for the purpose of delivering a stream of fertilizer to said soil opening devices, wherein said soil opening devices are arranged sufficiently close together to place seed and fertilizer in the soil in a configuration in which the roots from each seed row will share access to the fertilizer in a plurality of fertilizer bands.

20. The apparatus of claim 19 wherein said plurality of soil opening devices comprises left-hand and right-hand opener assemblies, together with left-hand and right-hand soil-engaging components, whereby adjacent soil opening devices may be conveniently mounted in close proximity to one another without functional interference.

21. The apparatus of claim 19 further including a low-disturbance residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming a wedge angle of 12 to 18 degrees and arranged to cause soil and residue to flow away from said deep-running rigid circular disc and the seed row, whereby debris, dry soil, and soil-active chemicals may be cleared from the path of the seed furrowing and seed placement means with a minimum of disturbance.

22. The apparatus of claim 19 further including a standard-disturbance residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming an initial leading edge wedge angle of 15 to 18 degrees, transitioning to a parabolic curve and arranged to cause soil and residue to flow away from said deep-running rigid circular disc and the seed row, whereby debris, dry soil, and soil-active chemicals may be cleared from the path of the seed furrowing and seed placement means.

23. The apparatus of claim 19 further including a furrowing residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming an initial leading edge wedge angle of 15 to 18 degrees, with an extension arranged to cause soil and residue to flow away from said deep-running rigid circular disc and the seed row, whereby debris, dry soil, and soil-active chemicals may be cleared from the path of the seed furrowing and seed placement means to a substantial extent and produce a deep-furrow tillage effect.

24. The apparatus of claim 19 wherein the fertilizer placement means includes a swept back slipperfoot shank rigidly mounted to said subframe adjacent to said deep-running rigid circular disc directly behind the cutting edge thereof, and on the side opposing the seed placement side of said deep-running rigid circular disc and arranged to place fertilizer near the bottom of said vertical slot in the soil adjacent to and below the seed while, by the shielding action of the deep-running disc, simultaneously leaving the bottom of the seed furrow firm and unfractured, whereby improving osmotic moisture flow to the seed and roots of the plant.

25. The apparatus of claim 19 in which the fertilizer placement means includes a radius fertilizer shank rigidly mounted to said subframe directly behind and trailing said deep-running rigid circular disc, and in the slot created by said deep-running rigid circular disc and arranged to place fertilizer near the bottom of said slot in the soil.

26. The apparatus of claim 19 in which the fertilizer placement means includes a swept back shank rigidly mounted to said subframe directly behind and trailing said deep-running rigid circular disc, and in the slot created by said deep-running rigid circular disc for the purpose of placing fertilizer near the bottom of said slot in the soil.

27. The apparatus of claim 19 in which the fertilizer dispensing means includes a direct injection orificed nozzle rigidly mounted to said subframe directly behind and trailing said deep-running rigid circular disc, operably connected to a source of pressurized liquid fertilizer and centered over the slot created by said deep-running rigid circular disc and arranged to deliver a stream of liquid fertilizer into said slot, which stream is substantially narrower in width extent than the width of the slot formed in the soil by said deep-running rigid circular disc, whereby liquid fertilizer is placed near the bottom of said slot in the soil without contact to the soil by a ground-engaging tool thereby improving the unfractured nature of the soil under the seed furrow.

28. The apparatus of claim 19 in which the seed placement means includes a second rigid circular disc rotatably fastened to said subframe means adjacent said deep-running rigid circular disc with its axis of rotation at a compound angle to the axis of rotation of said deep-running rigid circular disc and arranged to move soil away from said deep-running rigid circular disc and form a furrow therebeside with a seed-trapping raised berm between the deepest part of the seed furrow and said deep-running rigid circular disc, the bottom of the seed furrow comprised of firm, moist, and undisturbed soil.

29. The apparatus of claim 19 in which the seed placement means includes a slipperfoot seed furrowing placement device rigidly fastened to said subframe adjacent said deep-running rigid circular disc trailing a residue removal soil shaving knife, for the purpose of compressing and forming the bottom of the seed furrow and forming a raised soil berm between the deepest portion of the seed furrow and the slot formed by said deep-running rigid circular disc and placing seed in the seed furrow.

30. The apparatus of claim 29 in which said residue removal soil shaving knife and said slipperfoot seed furrowing placement device in combination as a single element are rigidly fastened to said subframe adjacent said deep-running rigid circular disc and arranged to first move soil and debris away from said deep-running rigid circular disc, then form a seed furrow by compressing and forming the bottom of the seed furrow and forming a raised soil berm between the deepest portion of the seed furrow and the slot formed by said deep-running rigid circular disc, then place seed therein, whereby the apparatus is further simplified and reduced in size and cost such that rows of seed and bands of fertilizer may be placed in a configuration in the soil which will allow adjacent rows of seed to share access to two or more bands of fertilizer and whereby previously incompatible fertilizer types may be used together compatibly.

31. The apparatus of claim 30 in which the soil shaving knife is a low disturbance residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming a wedge angle of 12 to 18 degrees and arranged to cause soil and residue to flow away from said deep-running rigid circular disc and the seed row, whereby debris, dry soil, and soil-active chemicals may be cleared from the path of the seed furrowing and seed placement means with a minimum of disturbance.

32. The apparatus of claim 30 in which the soil shaving knife is a standard disturbance residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming an initial leading edge wedge angle of 15 to 18 degrees, transitioning to a parabolic curve and arranged to cause soil and residue to flow away from said deep-running rigid circular disc and the seed row, whereby debris, dry soil, and soil-active chemicals may be cleared from the path of the seed furrowing and seed placement means.

33. The apparatus of claim 30 in which the soil shaving knife is a furrowing residue removal soil shaving knife means which is rigidly mounted to said subframe immediately beside said deep-running rigid circular disc at an angle of 15 to 25 degrees to the vertical direction such that the lower end is trailing the upper end, and with a sharpened leading edge forming an initial leading edge wedge angle of 15 to 18 degrees, with an extension and arranged to cause soil and residue to flow away from said deep-running rigid circular disc and the seed row, whereby debris, dry soil, and soil-active chemicals may be cleared from the path of the seed furrowing and seed placement means to a substantial extent and produce a deep-furrow tillage effect.

* * * * *